(12) United States Patent
Lee et al.

(10) Patent No.: US 9,575,721 B2
(45) Date of Patent: Feb. 21, 2017

(54) HEAD MOUNTED DISPLAY AND METHOD OF CONTROLLING THEREFOR

(71) Applicant: LG ELECTRONICS INC., Seoul (KR)

(72) Inventors: Doyoung Lee, Seoul (KR); Jongho Kim, Seoul (KR); Jihwan Kim, Seoul (KR); Sinae Chun, Seoul (KR); Yongsin Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 4 days.

(21) Appl. No.: 14/604,460

(22) Filed: Jan. 23, 2015

(65) Prior Publication Data

US 2015/0130711 A1    May 14, 2015

Related U.S. Application Data

(63) Continuation-in-part of application No. 14/094,471, filed on Dec. 2, 2013, now Pat. No. 9,024,845.
(Continued)

(30) Foreign Application Priority Data

Sep. 26, 2013    (KR) ........................ 10-2013-0114782

(51) Int. Cl.
  *G06F 3/16*    (2006.01)
  *G02B 27/01*    (2006.01)
  *G02B 27/00*    (2006.01)

(52) U.S. Cl.
  CPC ............ *G06F 3/167* (2013.01); *G02B 27/017* (2013.01); *G02B 27/0093* (2013.01);
  (Continued)

(58) Field of Classification Search
  CPC ... G06F 3/16; G02B 27/01; G02B 2027/0105; G02B 2027/0107; G02B 2027/0109; G02B 2027/011; G02B 2027/0112; G02B 2027/0114; G02B 2027/0116; G02B 2027/0118; G02B 2027/012; G02B 2027/0121; G02B 2027/0123; G02B 2027/0125; G02B 2027/0127
  (Continued)

(56) References Cited

U.S. PATENT DOCUMENTS 5,224,151 A    6/1993    Bowen et al.
5,585,871 A    12/1996    Linden
(Continued)

FOREIGN PATENT DOCUMENTS

JP    2005070308 A    3/2005
JP    2009253786 A    10/2009

OTHER PUBLICATIONS

International Search Report for PCT/KR2013/011400 dated Apr. 25, 2014.

*Primary Examiner* — Grant Sitta
(74) *Attorney, Agent, or Firm* — Birch, Stewart, Kolasch & Birch, LLP

(57) ABSTRACT

A method of controlling a head mounted display (HMD) according to one embodiment of the present specification includes performing a first operation, receiving a first voice input through an audio input unit, processing the first voice input with respect to the first operation while a first contact is detected through a first sensor positioned at a nose pad of the HMD, detecting the first contact being released through the first sensor positioned at a nose pad of the HMD, receiving a second voice input through the audio input unit while the first contact is released, and performing a second operation according to the received second voice input.

18 Claims, 13 Drawing Sheets

Related U.S. Application Data

(60) Provisional application No. 61/858,579, filed on Jul. 25, 2013.

(52) U.S. Cl.
CPC ........... *G02B 2027/014* (2013.01); *G02B 2027/0138* (2013.01); *G02B 2027/0178* (2013.01); *G02B 2027/0187* (2013.01)

(58) Field of Classification Search
USPC .................................................. 345/156, 7–8
See application file for complete search history.

(56) References Cited

U.S. PATENT DOCUMENTS

| | | | |
|---|---|---|---|
| 5,635,948 A | 6/1997 | Tonosaki | |
| 5,684,294 A | 11/1997 | Kouhi | |
| 6,532,447 B1* | 3/2003 | Christensson | H04M 1/271 |
| | | | 327/517 |
| 6,853,850 B2 | 2/2005 | Shim et al. | |
| 7,123,215 B2* | 10/2006 | Nakada | G02B 27/017 |
| | | | 345/2.1 |
| 7,418,392 B1* | 8/2008 | Mozer | G10L 15/26 |
| | | | 315/307 |
| 8,184,067 B1 | 5/2012 | Braun et al. | |
| 8,497,465 B2 | 7/2013 | Hammond | |
| 8,666,750 B2* | 3/2014 | Buck | G10L 15/28 |
| | | | 704/231 |
| 8,907,867 B2* | 12/2014 | Wong | G06F 1/3231 |
| | | | 345/7 |
| 9,016,857 B2* | 4/2015 | Benko | G06F 1/163 |
| | | | 351/158 |
| 9,024,845 B2* | 5/2015 | Kim | G02B 27/017 |
| | | | 345/156 |
| 2006/0037038 A1 | 2/2006 | Buck | |
| 2006/0052146 A1 | 3/2006 | Ou | |
| 2006/0061544 A1 | 3/2006 | Min et al. | |
| 2009/0013052 A1* | 1/2009 | Robarts | G06F 17/30867 |
| | | | 709/206 |
| 2009/0060240 A1* | 3/2009 | Coughlan | H04M 1/72591 |
| | | | 381/314 |
| 2009/0160802 A1 | 6/2009 | Yasumi | |
| 2010/0013739 A1 | 1/2010 | Sako et al. | |
| 2010/0245585 A1 | 9/2010 | Fisher et al. | |
| 2011/0213553 A1* | 9/2011 | Taniguchi | G01C 21/3608 |
| | | | 701/431 |
| 2011/0319128 A1 | 12/2011 | Miwa | |
| 2012/0056847 A1 | 3/2012 | Milford | |
| 2012/0236025 A1 | 9/2012 | Jacobsen et al. | |
| 2012/0262452 A1 | 10/2012 | Tadao | |
| 2013/0069787 A1 | 3/2013 | Petrou | |
| 2013/0135196 A1 | 5/2013 | Park et al. | |
| 2013/0154906 A1 | 6/2013 | Braun et al. | |
| 2013/0182867 A1 | 7/2013 | Knowles | |
| 2014/0139439 A1 | 5/2014 | Park | |

\* cited by examiner

FIG. 3
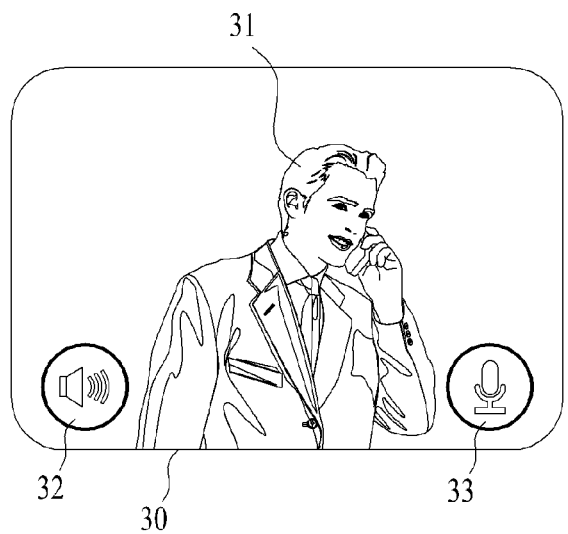
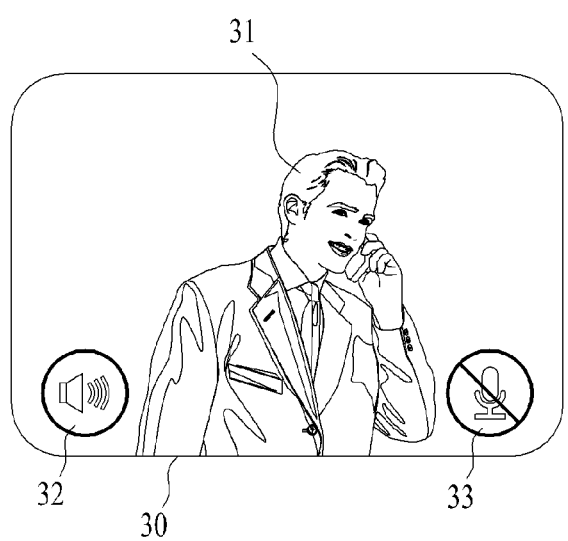
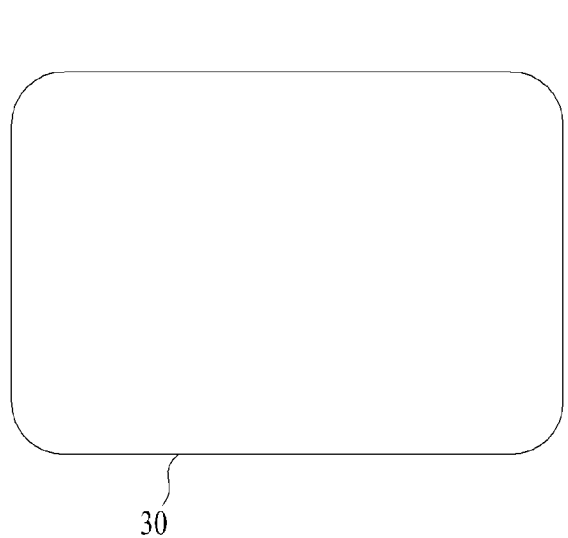

FIG. 4
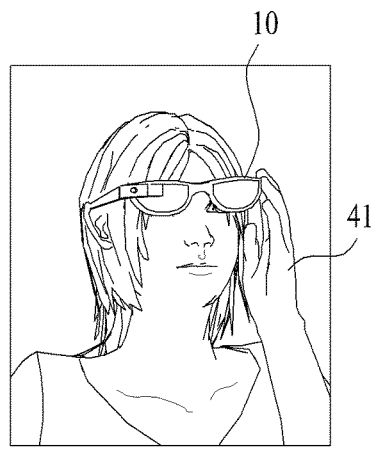
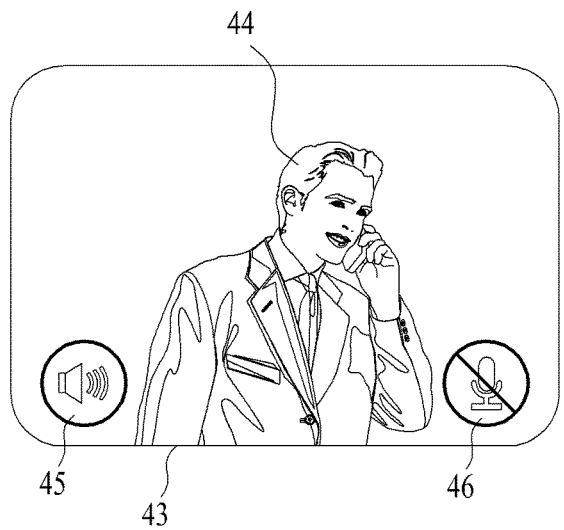
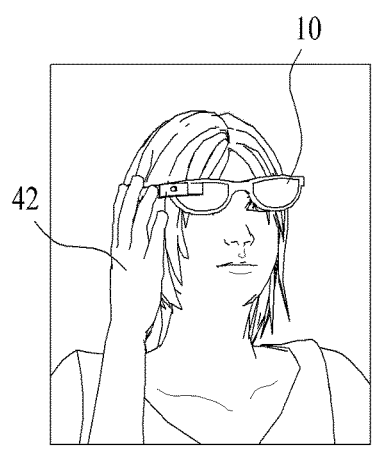
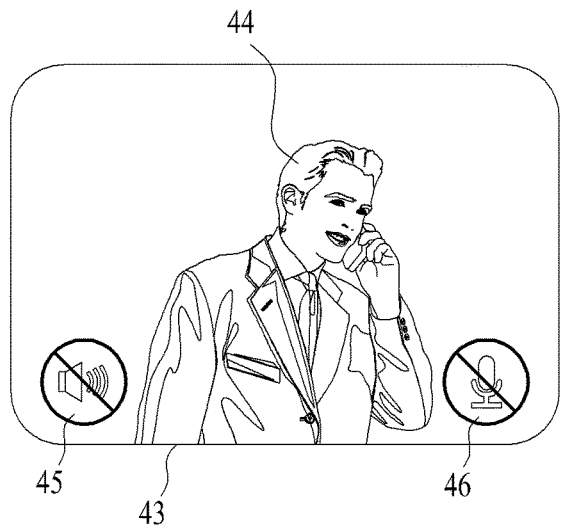
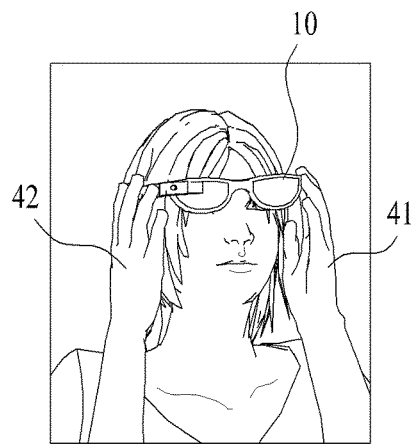
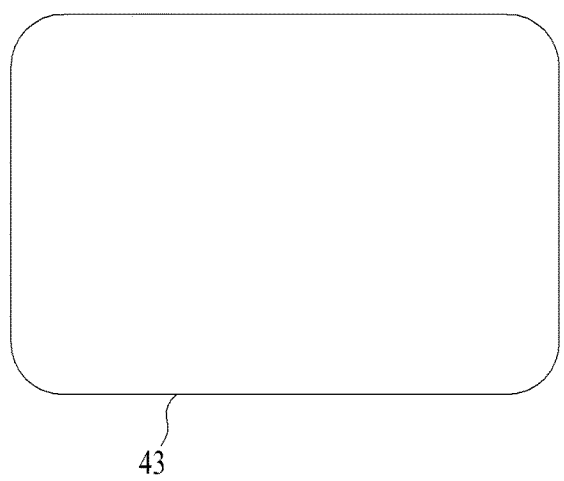

FIG. 5
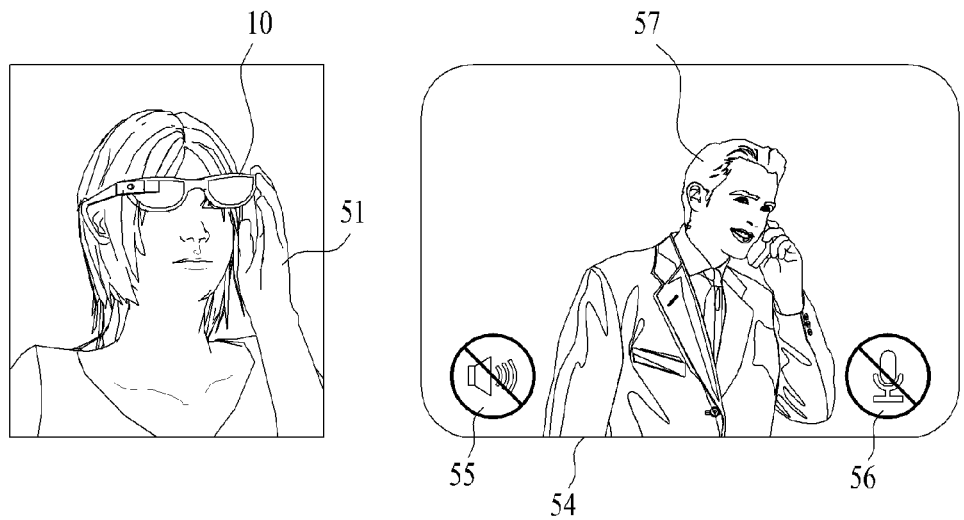
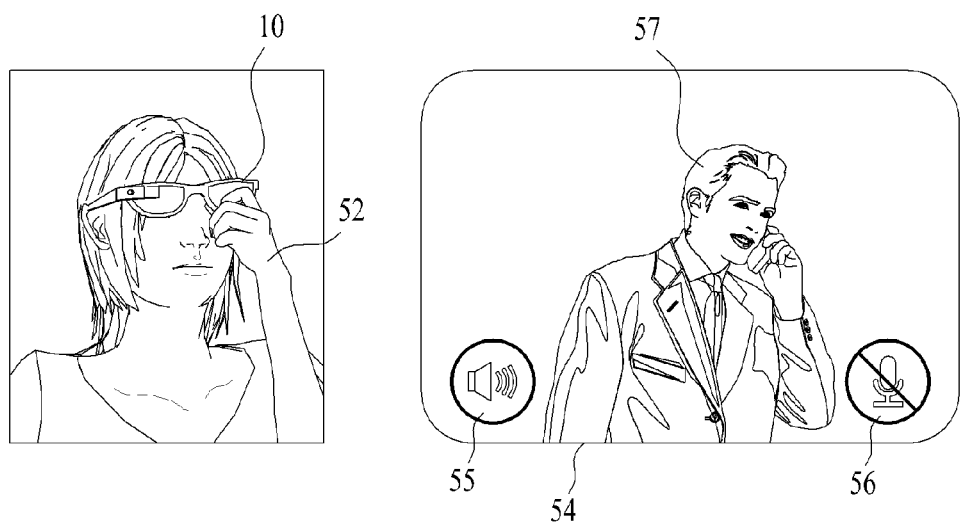
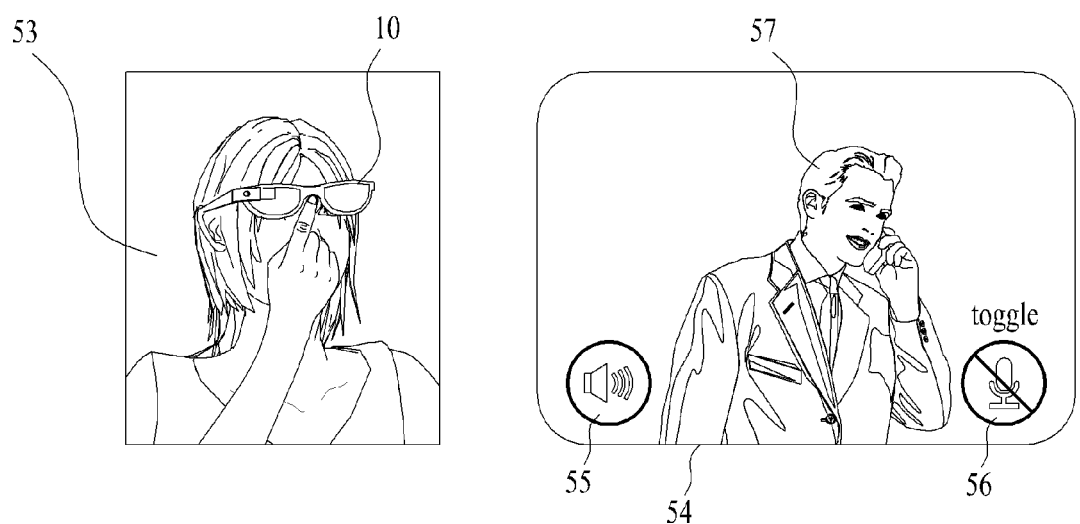

HEAD MOUNTED DISPLAY AND METHOD OF CONTROLLING THEREFOR

This application is a Continuation-in-Part of U.S. application Ser. No. 14/094,471 filed on Dec. 2, 2013, which claims the benefit of U.S. provisional Patent Application No. 61/858,579 filed on Jul. 25, 2013, and Korean Patent Application No. 10-2013-0114782 filed on Sep. 26, 2013, all of which are hereby expressly incorporated by reference into the present application.

BACKGROUND OF THE INVENTION

Field of the Invention

The present specification relates to a head mounted display, and more particularly, to a head mounted display activating or inactivating an audio input/output unit and a display unit according to a mode.

Discussion of the Related Art

As a head mounted display has been lightened, users can wear the head mounted display like glasses. Users can perform a voice call or a video call using the head mounted display. Since it is difficult for the head mounted display to be equipped with various buttons on the surface of the head mounted display, the head mounted display may have low operability due to an attribute of the device. Hence, in case of performing a voice call or a video call using the head mounted display, a method of providing an additional function via a simple operation is required. For instance, in case of performing a voice call or a video call, a method of controlling the head mounted display not to deliver a voice of a user to the other party with a simple operation only is required.

SUMMARY OF THE INVENTION

Accordingly, the present specification is directed to an apparatus and method thereof that substantially obviate one or more problems due to limitations and disadvantages of the related art.

An object of the present specification is to provide a head mounted display activating or inactivating an audio input/output unit or a display unit according to a mode of wearing. In particular, according to the present specification, it is necessary for the head mounted display to provide a method of distinguishing the mode using a sensor unit and a method of activating or inactivating at least one selected from the group consisting of an audio input unit, an audio output unit, and a display unit according to the mode.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, according to one embodiment, a head mounted display (HMD) includes a display unit configured to display a digital image, an audio input unit configured to receive an audio signal and configured to convert the audio signal to an electric signal, a first sensor configured to detect a first contact in a manner of being positioned at a nose pad of the HMD, a second sensor configured to detect a second contact in a manner of being positioned at a temple of the HMD, and a controller configured to control the display unit, the audio input unit, the first sensor, and the second sensor, if the first contact and the second contact are detected, the controller configured to activate a wearing mode, if the first contact is not detected and the second contact is detected, the controller configured to activate a mute mode, if the first contact and the second contact are not detected, the controller configured to activate a non-wearing mode, if the first contact is not detected in the wearing mode, the controller configured to switch the wearing mode to the mute mode, if the first contact is detected in the mute mode, the controller configured to switch the mute mode to the wearing mode, if the second contact is not detected in the mute mode, the controller configured to switch the mute mode to the non-wearing mode, if the first contact and the second contact are detected in the non-wearing mode, the controller configured to switch the non-wearing mode to the wearing mode.

To achieve these and other advantages and in accordance with the purpose of the present specification, as embodied and broadly described, according to one embodiment, a method of controlling a head mounted display (HMD) includes the steps of detecting a first contact contacted with a nose pad of the HMD, detecting a second contact contacted with a temple of the HMD, if the first contact and the second contact are detected, operating in a wearing mode to activate a display unit and an audio input unit, if the first contact is not detected and the second contact is detected, operating in a mute mode to activate the display unit and inactivate the audio input unit, and if the first contact and the second contact are not detected, operating in a non-wearing mode to inactivate the display unit and the audio input unit, wherein if the first contact is not detected in the wearing mode, the method switches the wearing mode to the mute mode, wherein if the first contact is detected in the mute mode, the method switches the mute mode to the wearing mode, wherein if the second contact is not detected in the mute mode, the method switches the mute mode to the non-wearing mode, wherein if the first contact and the second contact are detected in the non-wearing mode, the method switches the non-wearing mode to the wearing mode.

According to the present specification, a head mounted display can switch a mode of the head mounted display according to a detected result of a sensor unit.

According to the present specification, a head mounted display can detect a contact contacted by a nose of a user using a first sensor situated at a nose pad.

According to the present specification, a head mounted display can determine whether an audio input unit is activated depending on whether a contact is detected by a first sensor situated at a nose pad.

According to the present specification, a head mounted display can determine whether a camera unit is activated depending on whether a gaze of a user is detected.

According to the present specification, if a contact is not detected by a first sensor situated at a nose pad, a head mounted display can inactivate at least one selected from the group consisting of an audio input unit, an audio output unit, and a display unit according to a result detected by a second sensor situated at a temple.

According to the present specification, a head mounted display can toggle whether an audio input unit is activated according to a result detected by a third sensor situated at a bridge.

It is to be understood that both the foregoing general description and the following detailed description of the present specification are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is a diagram for an operating method according to a mode of an HMD according to one embodiment of the present specification;

FIG. 4 is a diagram for an operating method of a mute mode of an HMD according to one embodiment of the present specification;

FIG. 5 is a diagram for an operating method of a mute mode of an HMD according to a different embodiment of the present specification;

DETAILED DESCRIPTION OF THE INVENTION

While the embodiments have been concretely described with reference to the attached diagrams and the contents written on the diagrams, a scope of claims may be non-restricted or non-limited to the embodiments.

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

In the present specification, a head mounted display may include a wearable device capable of displaying visual information in a manner of being worn on a body of a user.

Figure 1:
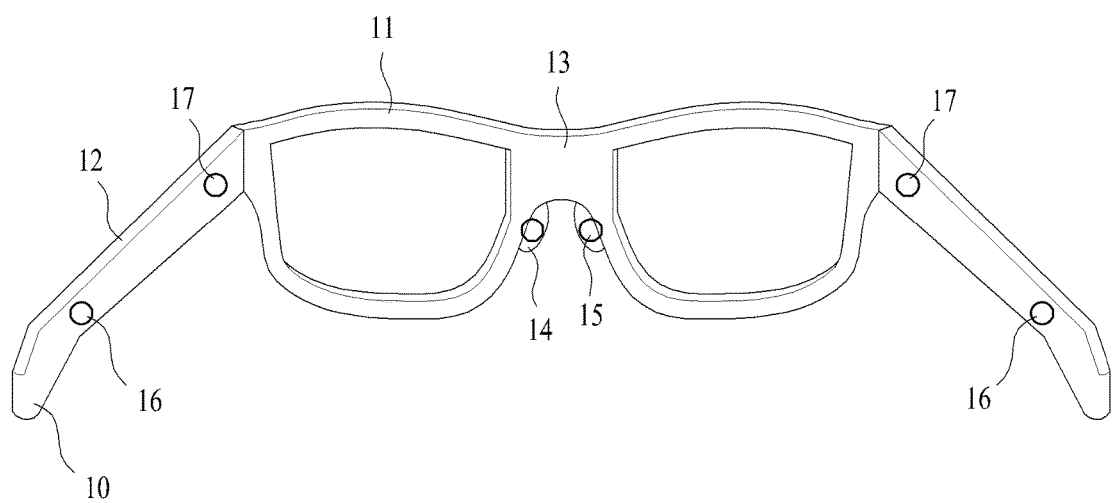
FIG. 1 is a diagram of a head mounted display (HMD) according to one embodiment of the present specification.

FIG. 1 is a diagram of a head mounted display (HMD) according to one embodiment of the present specification. Referring to FIG. 1, a head mounted display (hereinafter abbreviated HMD) can be divided into a plurality of parts. Referring to FIG. 1, the HMD 10 can include a display part 11, a temple part 12, a bridge part 13, and a nose pad part 14. The display part 11 displays a digital image and can provide visual information to a user. As depicted in FIG. 1, the display part 11 may have such a form as a rim of glasses. The display part 11 can include a display unit configured to project/display the visual information. According to a different embodiment, the display part may include a display unit and a frame supporting the display unit except the rim. The temple part 12 can fix the HMD 10 on a head of a user. The temple part 12 can include an audio input unit and an audio output unit. In particular, the temple part 12 can include an ear piece adjacent to an ear of a user and the audio output unit can be positioned at the ear piece. The bridge part 13 can be positioned between a left display part 11 and a right display part 11. The bridge part plays a role of connecting the left part and the right part of the HMD 10. The nose pad part 14 can support the HMD in a manner of being contacted with a nose of a user in order for the HMD 10 not to fall.

The HMD 10 can include a sensor unit configured to sense a state of being worn by the HMD of a user. The HMD 10 can sense a state of being worn by the HMD of a user using at least one selected from the group consisting of a proximity sensor, a touch sensor, an infrared sensor, and an image sensor. In FIG. 1, a position of the sensor included in the HMD 10 is represented by a circle. The HMD 10 can include a first sensor 15 in the nose pad part 14. The HMD 10 can sense whether the nose pad part 14 is contacted with a nose of a user using the first sensor 15. In the present specification, a contact between the nose pad part 14 of the HMD and a nose of a user can be defined as a first contact.

In a state of being worn by the HMD, if a user lifts up the display part 11, the nose pad part 14 can be separated from a nose of the user. In this case, the first sensor 15 can sense that the nose pad part 14 is no longer contacted with the nose of the user. The HMD 10 can determine whether at least one selected from the group consisting of an audio input unit, an audio output unit, and a display unit is activated using the sensed information. Regarding this, it shall be described in detail in FIG. 3 to FIG. 5.

The HMD 10 can include a second sensor 16 in the temple part 12. The HMD can include the second sensor 16 in an area where a head of a user is contacted with the temple part 12. In particular, the second sensor 16 can be positioned next to an audio output unit positioned at an ear piece of the temple part.

The temple part 12 of the HMD can include a left temple and a right temple. The HMD can include the second sensors 16 in the left temple and the right temple, respectively. The HMD can sense whether the temple part 12 is contacted with a head of a user using the second sensor 16. In the present specification, a contact between the temple part of the HMD and a head of a user can be defined as a second contact.

In a state of being worn by the HMD, if a user lifts up the display part 11, the second sensor 16 can still maintain a contact with a head of a user. When the contact is respectively detected by the second sensor positioned at the left temple and the second sensor positioned at the right temple, the HMD 10 can determine that the second contact is detected.

When a user takes off the HMD, the second sensor 16 of the HMD can release a contact with a head of the user. The HMD 10 can determine whether at least one selected from the group consisting of an audio input unit, an audio output unit, and a display unit is activated using sensed information.

The HMD 10 can distinguish a state of being worn by the HMD, a state that a glass part is lifted, and a state that the HMD is taken off using a result sensed by the first sensor 15 and the second sensor 16. A mode switching of the HMD according to a state of being worn by the HMD is described in detail in FIG. 2.

The HMD 10 can include a third sensor 17 in the display part 11 or the temple part 12. The HMD 10 can include the third sensor 17 in a position adjacent to the display part 11 among the temple part 12. The HMD 10 can judge whether a gaze of a user faces a display area of the HMD using the third sensor 17. The HMD 10 detects a gaze of a user and can judge whether the user is able to gaze into visual information displayed by the HMD. If a position of eyes of a user or a position of a gaze of a user corresponds to a position incapable of looking at the visual information displayed by the display unit, the HMD 10 can judge that the gaze of the user does not gaze into the display area of the HMD. The third sensor 17 can be positioned at the display part 11 or the temple part 12 of the HMD.

The HMD 10 can use a result sensed by using the third sensor in addition to a result sensed by using the first sensor 15 and the second sensor 16. By doing so, the HMD 10 can determine whether the display unit is to be inactivated in a state that a glass part is lifted. Regarding this, it shall be described in detail in FIG. 3.

The HMD 10 can include a fourth sensor in the temple part 12 except the second sensor 16 and the third sensor 17. The HMD 10 can detect a touch of a user on the temple part 12. When the HMD is separated from a nose of a user, the HMD 10 can determine which one among an audio input unit, an audio output unit, and a display unit is to be inactivated using a sensed result of the first sensor and a sensed result of the fourth sensor. Regarding this, it shall be described in detail in FIG. 4 to FIG. 5.

The HMD 10 can include a fifth sensor in the bridge part 11. If a contact is detected by the fifth sensor, the HMD 10 can toggle whether an audio input unit is activated. Regarding this, it shall be described in detail in FIG. 5.

Figure 2:
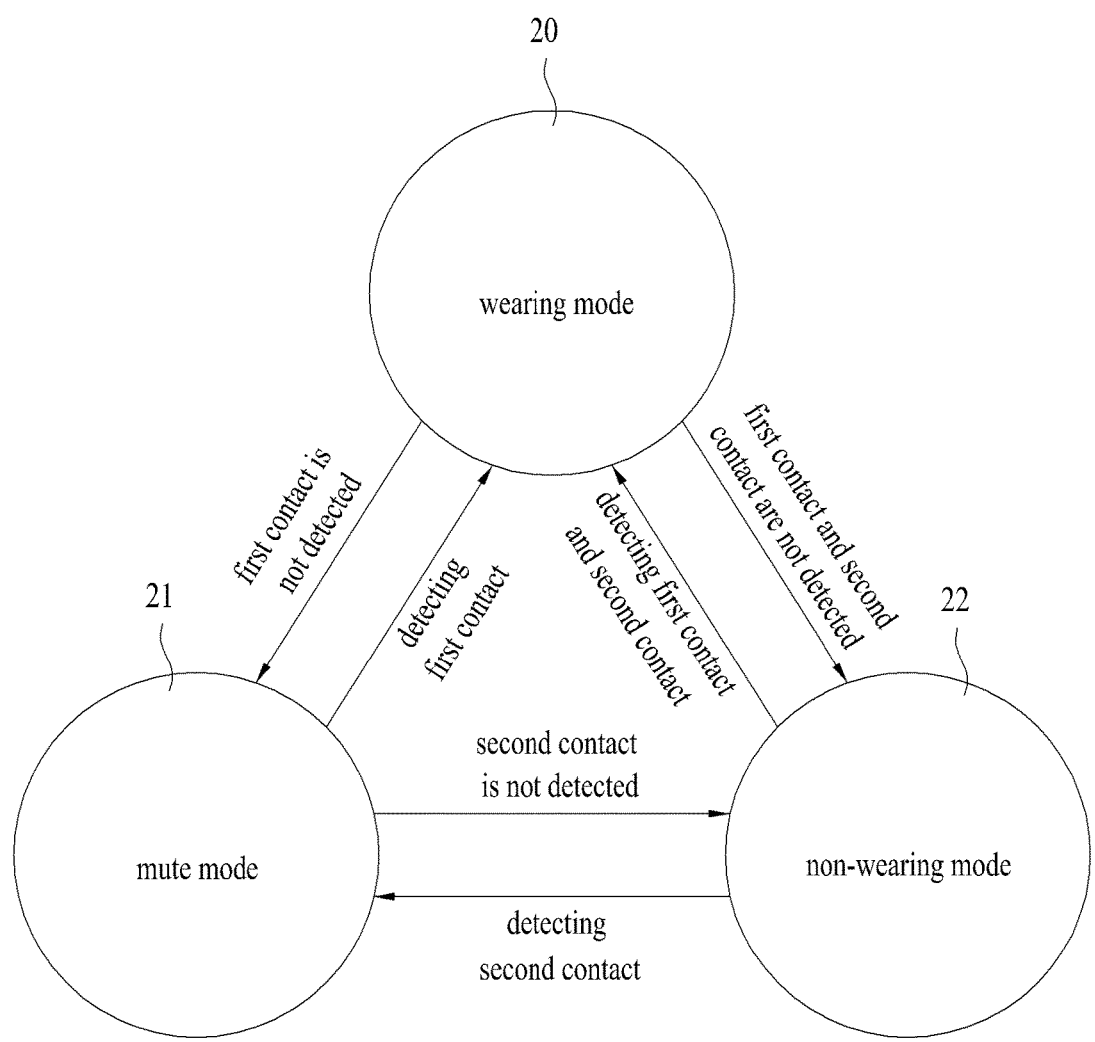
FIG. 2 is a diagram of a method for switching a mode of an HMD according to one embodiment of the present specification.

FIG. 2 is a diagram of a method for switching a mode of an HMD according to one embodiment of the present specification. The HMD can operate in a mode among a wearing mode 20, a mute mode 21, and a non-wearing mode 22. Although it is not depicted in FIG. 2, the HMD may operate in the mute mode and a display off mode. The HMD can activate an audio input unit, an audio output unit, and a display unit in the wearing mode 20. A user wearing the HMD in the wearing mode inputs/outputs auditory information using the audio input unit and the audio output unit and can check visual information using the display unit.

The HMD can inactivate the audio input unit in the mute mode 21. A user wearing the HMD in the mute mode may not deliver a voice of the user to the other party using the HMD of which the audio input unit is inactivated in the middle of a voice call. And, in case of capturing a video including a video information and an audio information, a user selectively stores the video information using the mute mode and can exclude the audio information from a target of storing.

The HMD can inactivate the audio input unit and the display unit in the mute mode and the display off mode. By inactivating the display unit, the HMD can obtain a power saving effect. By inactivating the audio input unit, the HMD can restrict a voice of a user or a sound inputted to the HMD. In the mute mode and the display off mode, the HMD can output the audio information using the audio output unit and a user can receive the audio information.

The HMD can inactivate the audio input unit, the audio output unit, and the display unit in the non-wearing mode 22. The HMD in the non-wearing mode may not output the video information and the audio information, thereby reducing power consumption. The HMD in the non-wearing mode can terminate a pairing with an external device paired with the HMD. If a user wears the HMD after a pairing between the HMD and a cellular phone is terminated, the HMD can switch to the wearing mode, the mute mode, or the mute and display off mode according to a result sensed by the first sensor, the second sensor, and the third sensor. In this case, the HMD can provide a telephone call via the HMD to a user in a manner of resuming the pairing with the cellular phone.

The HMD can switch a mode of the HMD according to results sensed by at least two sensors among the first sensor, the second sensor, and the third sensor. As depicted in FIG. 2, if a first contact is detected by the first sensor positioned at the nose pad and a second contact is detected by the second sensor positioned at the temple, the HMD can operate in the wearing mode. In this case, the first contact may correspond to a contact between the nose pad of the HMD and a nose of a user and the second contact may correspond to a contact between the temple of the HMD and a side of a face of a user.

For instance, when a user makes a call using the HMD, the HMD can deliver a voice signal of the user to the other party in a manner of activating the audio input unit. And, the HMD can display visual information in a manner of activating the display unit. In this case, the visual information can include such information on the other party of the telephone call as a face of the other party, a telephone number, and the like.

As a different embodiment, when a user captures a video using the HMD, the HMD can store the video information detected by the camera unit and the audio information inputted to the audio input unit.

In the wearing mode of the HMD, if the nose pad is separated from a nose of a user and the first contact is not detected, the HMD can switch the wearing mode to the mute mode. The mute mode may mean a mode that the HMD does not recognize voice information of the user wearing the HMD or a mode that the HMD bypasses the voice information of the user wearing the HMD.

For instance, when a user makes a call using the HMD, the HMD can restrict a voice signal of the user to be delivered to the other party in a manner of inactivating the audio input unit. When the user mentions private content, content not intended to be delivered to the other party, or content irrelevant to the telephone call, the mute mode can be used. Unlike the inactivated audio input unit, the HMD can display visual information in a manner of activating the display unit. In this case, the visual information can include such information on the other party of the telephone call as a face of the other party, a telephone number, and the like.

And, the HMD can deliver a voice of the other party to the user in a manner of maintaining the activated state of the audio output unit.

As a different embodiment, when a user captures a video using the HMD, the HMD selectively stores the video information detected by the camera unit and can temporarily exclude the audio information detected by the audio input unit from the video. In particular, the HMD can store a video from which the audio information is eliminated in the mute mode. When the first contact is detected by the first sensor, the HMD switches the mute mode to the wearing mode and can resume storing the audio information.

In the wearing mode of the HMD, if the first contact and the second contact are not detected because the nose pad is separated from a nose of a user and the temple is separated from a head of the user, respectively, the HMD can switch the wearing mode to the non-wearing mode.

For instance, when a user makes a call using the HMD, the HMD can terminate the call with the other party. According to embodiment, if the HMD is paired with a cellular phone, the HMD terminates the pairing and can grant a control authority to the cellular phone to enable the user to make a call to the other party using the cellular phone.

As a different embodiment, when a user captures a video using the HMD, the HMD can terminate the video capturing.

In the mute mode of the HMD, if the first contact is detected in a manner that the nose pad is contacted with a nose of a user, the HMD can switch the mute mode to the wearing mode.

In the mute mode of the HMD, if the second contact is not detected in a manner that the temple is separated from a nose of a user, the HMD can switch the mute mode to the non-wearing mode.

In the non-wearing mode of the HMD, if the second contact is detected in a manner that the temple is contacted with a head of a user, the HMD can switch the non-wearing mode to the mute mode.

In the non-wearing mode of the HMD, if the first contact and the second contact are detected in a manner that the nose pad is contacted with a nose of a user and the temple is contacted with a head of a user, respectively, the HMD can switch the non-wearing mode to the wearing mode.

Moreover, if a gaze of a user is not detected in the mute mode of the HMD, the HMD can switch the mute mode to the mute and the display off mode. In particular, if the gaze of the user is not detected although the second contact is detected, the HMD can inactivate the audio input unit and the display unit.

For instance, when a user makes a call using the HMD, the HMD can restrict a voice signal of the user to be delivered to the other party in a manner of inactivating the audio input unit. When the user mentions private content, content not intended to be delivered to the other party, or content irrelevant to the telephone call, the mute mode can be used. And, the HMD can stop displaying visual information in a manner of inactivating the display unit. If eyes of a user are unable to check visual information provided by the display unit, the HMD can inactivate the display unit to reduce unnecessary power consumption. On the contrary, the HMD can deliver a voice of the other party to the user in a manner of maintaining the activated state of the audio output unit.

As a different embodiment, when a user captures a video using the HMD, a video information detected by a camera and an audio information detected by the audio input unit can be temporarily excluded from the video. In particular, the HMD can temporarily stop the video capturing in the mute and the display off mode.

When eyes or a gaze of a user is detected by the third sensor within the display part, the HMD switches the mute and the display off mode to the mute mode and can resume capturing the video information by the camera unit. And, when a contact between the nose pad and a nose is detected by the first sensor, the HMD switches the mute mode to the wearing mode and can resume recording the audio information in addition to the video information capturing.

FIG. 3 is a diagram for an operating method according to a mode of an HMD according to one embodiment of the present specification. The top left of FIG. 3 is a diagram indicating a state of being worn by the HMD operating in the wearing mode. In case that a user wears the HMD as shown in the top left of FIG. 3, the HMD 10 can detect the first contact using the first sensor positioned at the nose pad part. And, the HMD 10 can detect the second contact using the second sensor positioned at the temple part.

Hence, the HMD can activate the wearing mode. The HMD 10 delivers a voice of a user to the other party of a telephone call using the audio input unit and can output auditory information using the audio output unit. And, the HMD 10 can provide visual information to the user using the display unit.

The top right of FIG. 3 is a diagram indicating visual information 30 displayed by the HMD operating in the wearing mode. In case of a video call in progress, the HMD 10 can display an image 31 of the other party of the video call. If a voice call is in progress, the image 31 of the other party of the voice call is not displayed or a substitute image may be displayed. The HMD 10 can display a first indicator 32 indicating whether the audio output unit is activated in the wearing mode. The HMD 10 can inform a user that the audio output unit is activated and auditory information is currently outputted using the first indicator.

The HMD 10 can display a second indicator 33 indicating whether the audio input unit is activated in the wearing mode. The HMD 10 can inform a user that the audio input unit is activated and a voice of the user is currently delivered to the other party of a telephone call in a manner of being inputted to the audio input unit using the second indicator.

The middle left of FIG. 3 is a diagram indicating the HMD operating in the mute mode. In case that a user wears the HMD as depicted in the middle left of FIG. 3, the HMD 10 can detect the second contact using the second sensor positioned at the temple part. Yet, the HMD cannot detect the first contact using the first sensor positioned at the nose pad part. This is because the nose pad part of the HMD is separated from a nose of the user by the user.

Hence, the HMD 10 can activate the mute mode. The HMD 10 outputs auditory information using the audio output unit and can provide visual information to the user using the display unit. In particular, the HMD delivers a voice of the other party to the user in a manner of outputting the voice of the other party and can display an image of the other party of a telephone call. Yet, the HMD 10 inactivates the audio input unit and may be then able to restrict a voice of the user to be delivered to the other party of the telephone call.

The middle right of FIG. 3 is a diagram of visual information 30 displayed by the HMD operating in the mute mode. In case of a video call in progress, the HMD 10 can display an image 31 of the other party of the video call. If a voice call is in progress, the image 31 of the other party of the voice call is not displayed or a substitute image may be displayed. The HMD 10 can display a first indicator 32 indicating whether the audio output unit is activated in the mute mode. The HMD 10 can inform a user that the audio output unit is activated and auditory information is currently outputted using the first indicator.

The HMD 10 can display a second indicator 33 indicating whether the audio input unit is activated in the mute mode. The HMD 10 can inform a user that the audio input unit is inactivated and a voice of the user is not currently delivered to the other party of a telephone call using the second indicator.

The bottom left of FIG. 3 is a diagram indicating the HMD operating in the mute and display off mode. If a user wears the HMD as depicted in the bottom left of FIG. 3, the HMD 10 can detect the second contact using the second sensor positioned at the temple part. Yet, the HMD cannot detect the first contact using the first sensor positioned at the nose pad part. And, the HMD 10 cannot detect a gaze of the user using the third sensor positioned at the display part or the temple part. This is because the nose pad part of the HMD is separated from a nose of the user by the user and the display part of the HMD deviated from a sight of the user.

Hence, the HMD 10 can activate the mute and display off mode. The HMD 10 can output auditory information using the audio output unit. In particular, the HMD can deliver a voice of the other party to a user in a manner of outputting the voice of the other party. Yet, the HMD 10 inactivates the display unit and may be then able to restrict visual information to be provided to the user. By doing so, the HMD 10 may obtain a power saving effect. And, the HMD 10 inactivates the audio input unit and may be then able to restrict a voice of the user to be delivered to the other party of a telephone call.

The bottom right of FIG. 3 is a diagram indicating visual information 30 displayed by the HMD operating in the mute and display off mode. In the mute and display off mode, the HMD 10 may not display an image of the other party of a telephone call not only in a voice call but also in a video call. And, the HMD may not display the first indicator indicating whether the audio output unit is activated and the second indicator indicating whether the audio input unit is activated. In particular, the HMD 10 may not deliver visual information in a manner of inactivating the display mode in the mute and display off mode of which a gaze of a user is not detected. By doing so, it may obtain a power saving effect.

FIG. 4 is a diagram for an operating method of a mute mode of an HMD according to one embodiment of the present specification. The HMD 10 can sense a first contact between a nose of a user and a nose pad part using the first sensor positioned at the nose pad part. If the HMD 10 detects a release of the first contact, the HMD can activate the mute mode. The HMD 10 can sense a fourth contact between a hand of a user and a temple part using a fourth sensor positioned at the temple part. The HMD 10 can include the fourth sensors in a left temple and a right temple, respectively. The HMD 10 can determine whether the audio input unit, the audio output unit, and the display unit are inactivated according to a sensed result for the fourth contact in the mute mode.

The top left of FIG. 4 is a diagram indicating a method of switching the HMD to the mute mode in a manner that a user lifts up the HMD using a left hand. The HMD 10 can detect a release of the first contact between a nose of a user and the nose pad part using the first sensor positioned at the nose pad part. Since the first contact is released, the HMD 10 can activate the mute mode.

Moreover, the HMD 10 can sense the fourth contact between a hand 41 of a user and the temple part using the fourth sensor positioned at the left temple part. If the fourth contact is detected together with the release of the first contact, the HMD 10 can inactivate the audio input unit in the mute mode. In the following description, the mute mode of which the audio input unit is inactivated can be defined as a first mute mode. The HMD 10 outputs auditory information using the audio output unit and can provide visual information to a user using the display unit. In particular, the HMD 10 delivers a voice of the other party to the user in a manner of outputting the voice of the other party and can display an image of the other party of a telephone call. Yet, the HMD 10 inactivates the audio input unit and may be then able to restrict a voice of the user to be delivered to the other party of the telephone call.

The top right of FIG. 4 is a diagram of visual information 43 displayed by the HMD operating in the first mute mode. In case of a video call in progress, the HMD 10 can display an image 44 of the other party of the video call. If a voice call is in progress, the image 44 of the other party of the call is not displayed or a substitute image may be displayed.

The HMD 10 can display a first indicator 45 indicating whether the audio output unit is activated in the first mute mode. The HMD 10 can inform a user that the audio output unit is activated and auditory information is currently outputted using the first indicator in the first mute mode.

The HMD 10 can display a second indicator 46 indicating whether the audio input unit is activated in the first mute mode. The HMD 10 can inform a user that the audio input unit is inactivated and a voice of the user is not currently delivered to the other party of a telephone call using the second indicator in the first mute mode.

The middle left of FIG. 4 is a diagram indicating a method of switching the HMD to the mute mode in a manner that a user lifts up the HMD using a right hand. The HMD 10 can detect a release of the first contact between a nose of the user and the nose pad part using the first sensor positioned at the nose pad part. Since the first contact is released, the HMD 10 can activate the mute mode.

Moreover, the HMD 10 can sense the fourth contact between a hand 42 of a user and the temple part using the fourth sensor positioned at the right temple part. If the fourth contact is detected together with the release of the first contact, the HMD 10 can inactivate the audio input unit in the mute mode. And, the HMD 10 can additionally inactivate the audio output unit. In particular, according to whether the fourth contact of the user is detected on the left temple or the right temple, the HMD 10 can differently determine whether the audio input unit is inactivated from whether the audio output unit is inactivated. In the following description, the mute mode of which the audio input unit and the audio output unit are inactivated can be defined as a second mute mode.

The HMD 10 can provide visual information to a user using the display unit. In particular, the HMD 10 can display an image of the other party of a telephone call. Yet, the HMD 10 inactivates the audio input unit and the audio output unit and may be then able to restrict a voice of the user to be delivered to the other party of the call and a voice of the other party of the call to be outputted.

The middle right of FIG. 4 is a diagram of visual information 43 displayed by the HMD operating in the second mute mode. In case of a video call in progress, the HMD 10 can display an image 44 of the other party of the video call. If a voice call is in progress, the image 44 of the other party of the call is not displayed or a substitute image may be displayed.

The HMD 10 can display a first indicator 45 indicating whether the audio output unit is activated in the second mute mode. The HMD 10 can inform a user that the audio output unit is inactivated and auditory information is not currently outputted using the first indicator in the second mute mode.

The HMD 10 can display a second indicator 46 indicating whether the audio input unit is activated in the second mute mode. The HMD 10 can inform a user that the audio input unit is inactivated and a voice of the user is not currently delivered to the other party of a telephone call using the second indicator in the second mute mode.

The bottom left of FIG. 4 is a diagram indicating a method of switching the HMD to the mute mode in a manner that a user lifts up the HMD using both hands. The HMD 10 can detect a release of the first contact between a nose of the user and the nose pad part using the first sensor positioned at the nose pad part. Since the first contact is released, the HMD 10 can activate the mute mode.

Moreover, the HMD 10 can sense the fourth contacts between hands 41/42 of a user and the temple part using the fourth sensors positioned at the left and the right temple part. If the fourth contacts are detected together with the release of the first contact, the HMD 10 can inactivate the audio input unit in the mute mode. And, the HMD 10 can additionally inactivate the audio output unit and the display unit. In particular, according to whether the fourth contact of the user is detected on either the left temple or the right temple or is detected on both temple parts, the HMD 10 can differently determine whether the audio input unit, the audio output unit, and the display unit are inactivated. In the following description, the mute mode of which the audio input unit, the audio output unit, and the display unit are inactivated can be defined as a third mute mode.

The HMD 10 inactivates the audio input unit and the audio output unit and may be then able to restrict a voice of the user to be delivered to the other party of a call and a voice of the other party of the call to be outputted. And, the HMD 10 inactivates the display unit and may be then able to restrict visual information to be displayed.

The bottom right of FIG. 4 is a diagram of visual information 43 displayed by the HMD operating in the third mute mode. The HMD 10 may not display an image of the other party of a telephone call, which is used to be displayed in the first mute mode and the second mute mode, the first indicator, and the second indicator. The HMD 10 can obtain a power saving effect by inactivating the display unit.

As mentioned in the foregoing description, the HMD 10 can respectively determine whether the audio input unit, the audio output unit, and the display unit are inactivated depending on whether the hand lifted up the HMD corresponds to a left hand, a right hand, or both hands. The above-mentioned embodiment is just one embodiment among many embodiments and the method of inactivating each unit according to the hand of the user lifted up the HMD can be differently applied according to embodiment.

FIG. 5 is a diagram for an operating method of a mute mode of an HMD according to a different embodiment of the present specification. The HMD 10 can sense a first contact between a nose of a user and the nose pad part using a first sensor positioned at the nose pad part. If a release of the first contact is detected, the HMD 10 can activate the mute mode. The HMD 10 can sense a fourth contact between a hand of a user and the temple part using a fourth sensor positioned at the temple part. The HMD 10 can sense a fifth contact between the hand of the user and the bridge part using a fifth sensor positioned at the bridge part. The HMD 10 detects a release of the first contact and can determine whether the audio input unit and the audio output unit are inactivated according to whether the fourth contact or the fifth contact is detected together with the first contact in the mute mode.

The top left of FIG. 5 is a diagram indicating a method of switching the HMD to the mute mode in a manner that a user lifts up the HMD. The HMD 10 can detect a release of the first contact between a nose of the user and the nose pad part using the first sensor positioned at the nose pad part. Since the first contact is released, the HMD 10 can activate the mute mode.

Moreover, the HMD 10 can sense the fourth contact between a hand 41 of a user and the temple part using the fourth sensor positioned at the left temple part. If the fourth contact is detected together with the release of the first contact, the HMD 10 can inactivate the audio input unit and the audio output unit in the mute mode. In particular, the HMD 10 can activate the second mute mode mentioned earlier in FIG. 4. The aforementioned fourth sensor can be installed in at least one of the left temple part and the right temple part.

The HMD 10 operating in the second mute mode can provide visual information to a user using the display unit. In particular, the HMD 10 can display an image of the other party of a call. Yet, the HMD 10 inactivates the audio input unit and the audio output unit and may be then able to restrict a voice of the user to be delivered to the other party of the call and a voice of the other party of the call to be outputted.

The top right of FIG. 5 is a diagram of visual information 54 displayed by the HMD operating in the second mute mode. In case of a video call in progress, the HMD 10 can display an image 57 of the other party of the video call. If a voice call is in progress, the image 57 of the other party of the call is not displayed or a substitute image may be displayed.

The HMD 10 can display a first indicator 55 indicating whether the audio output unit is activated in the second mute mode. The HMD 10 can inform a user that the audio output unit is inactivated and auditory information is not currently outputted using the first indicator in the second mute mode.

The HMD 10 can display a second indicator 56 indicating whether the audio input unit is activated in the second mute mode. The HMD 10 can inform a user that the audio input unit is inactivated and a voice of the user is not currently delivered to the other party of a telephone call using the second indicator in the second mute mode.

The middle left of FIG. 5 is a diagram indicating a method of switching the HMD to the mute mode in a manner that a user lifts up the HMD. The HMD 10 can detect a release of the first contact between a nose of the user and the nose pad part using a first sensor positioned at the nose pad part. Since the first contact is released, the HMD 10 can activate the mute mode.

If a fourth contact between a hand 52 of the user and the temple part is not detected by a fourth sensor positioned at the temple part, the HMD 10 can inactivate the audio input unit in the mute mode. In particular, the HMD 10 can activate the first mute mode mentioned earlier in FIG. 4.

The aforementioned fourth sensor can be positioned at the left temple part and the right temple part. Hence, if a user lifts up the HMD without touching the temple part, the fourth contact may be not detected and the HMD 10 can activate the first mute mode.

The HMD 10 outputs auditory information using the audio output unit and can provide visual information to a user using the display unit in the first mute mode. In particular, the HMD 10 delivers a voice of the other party to the user in a manner of outputting the voice of the other party and can display an image of the other party of a call. Yet, the HMD 10 inactivates the audio input unit and may be then able to restrict a voice of the user to be delivered to the other party of the call.

The middle right of FIG. 5 is a diagram of visual information 54 displayed by the HMD operating in the first mute mode. In case of a video call in progress, the HMD 10 can display an image 57 of the other party of the video call. If a voice call is in progress, the image 57 of the other party of the call is not displayed or a substitute image may be displayed.

The HMD 10 can display a first indicator 55 indicating whether the audio output unit is activated in the first mute mode. The HMD 10 can inform a user that the audio output unit is activated and auditory information is currently outputted using the first indicator in the first mute mode.

The HMD 10 can display a second indicator 56 indicating whether the audio input unit is activated in the first mute mode. The HMD 10 can inform a user that the audio input unit is inactivated and a voice of the user is not currently delivered to the other party of a telephone call using the second indicator in the first mute mode.

The bottom left of FIG. 5 is a diagram indicating a method of toggling whether the audio input unit is activated in a manner that a user lifts up the HMD. The HMD 10 can detect a fifth contact between a hand of a user and the bridge part using a fifth sensor positioned at the bridge part. The HMD 10 can toggle the power of the audio input unit whenever the fifth contact is detected. In particular, if the fifth contact is detected, the HMD 10 inactivates the audio input unit. If the fifth contact is detected again, the HMD can activate the audio input unit. By doing so, the HMD 10 can permit/restrict a voice of the user to be delivered to the other party.

The bottom right of FIG. 5 is a diagram of visual information 54 displayed by the HMD toggling the audio input unit. In case of a video call in progress, the HMD 10 can display an image 57 of the other party of the video call. If a voice call is in progress, the image 57 of the other party of the call is not displayed or a substitute image may be displayed.

The HMD 10 can display a first indicator 55 indicating whether the audio output unit is activated. The HMD 10 can inform a user that the audio output unit is activated and auditory information is currently outputted using the first indicator in the first mute mode.

The HMD 10 can display a second indicator 56 indicating whether the audio input unit is activated. The HMD 10 can inform a user that the audio input unit is activated and a voice of the user is delivered to the other party of the call or the HMD can inform the user that the audio input unit is inactivated and a voice of the user is not delivered to the other party of the call using the second indicator according to a toggle for the power of the audio input unit.

Figure 6:
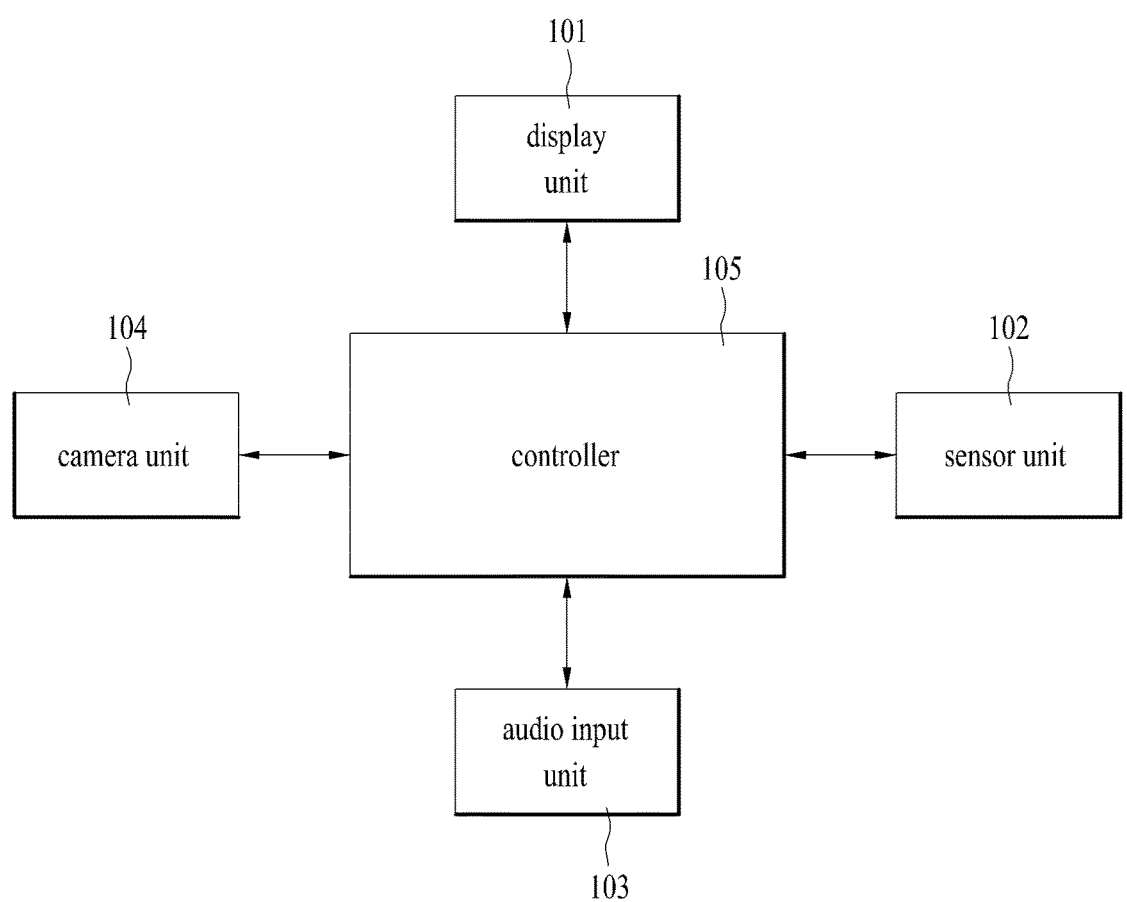
FIG. 6 is a block diagram of an HMD according to one embodiment of the present specification.

FIG. 6 is a block diagram of an HMD according to one embodiment of the present specification. The HMD can include a display unit 101, a sensor unit 102, an audio input unit 103 and a controller 105. According to embodiment, the HMD may further include at least one of a camera unit 104, an audio output unit, a voice recognition unit and a communication unit.

The display unit 101 can display visual information. The display unit 101 can display an image of the other party in case of performing a video call. And, the display unit 101 can display whether the audio input unit and the audio output unit are activated using an indicator. The display unit 101 can include a first display unit and a second display unit corresponding to a left eye and a right eye of a user, respectively. And, the display unit can further include a projector.

The display unit 101 can include at least one selected from the group consisting of an organic light-emitting diode (OLED), a liquid crystal display (LCD), an e-ink, a projector, and a flexible display.

The sensor unit 102 can detect whether the HMD is worn. The sensor unit 102 can detect a state of being worn by the HMD using at least one selected from the group consisting of a contact sensor, a touch sensor, an image sensor, and a proximity sensor.

The sensor unit 102 can include a first sensor configured to detect a contact in a manner of being positioned at the nose pad part and a second sensor configured to detect a contact in a manner of being positioned at the temple part. And, the sensor unit 102 can further include a third sensor configured to detect a gaze of a user in a manner of being positioned at the temple part, a fourth sensor configured to detect a contact contacted by a hand of a user in a manner of being positioned at the temple part, and a fifth sensor configured to detect a contact in a manner of being positioned at the bridge part. In this case, the HMD according to the present specification can include the third, the fourth, and the fifth sensor as an optional configuration element. According to embodiment, it may vary whether the third, the fourth, and the fifth sensor are included.

The first sensor among the sensor unit 102 can detect a first contact between a nose of a user, which is a target of a contact, and the nose pad part. If the nose of the user is separated from the nose pad part, the first sensor can measure a first distance between the nose of the user and the first sensor. The first sensor can deliver information on the measured first distance to the controller 105. The controller 105 can control a mute level according to the measured first distance. According to embodiment, the HMD can further include an audio output unit. If the measured first distance is greater than a first threshold, the controller 105 can inactivate the audio output unit. According to embodiment, the HMD can further include a camera unit 104 configured to capture a digital image. If the measured first distance is greater than a second threshold, the controller can stop capturing a digital image. In this case, the first threshold may be equal to the second threshold or less than the second threshold.

The sensor unit 102 can deliver information on results sensed by each of the aforementioned sensors to the controller.

The audio input unit 103 can convert an audio signal to an electric signal. For instance, in case that the HMD performs a video call or a voice call, the audio input unit 103 can deliver a voice of a user to the other party of the call in a manner of converting the voice of the user to an electric signal. And, in case that the HMD captures a video, the audio input unit 103 converts a sound to an electric signal and can store the signal as an audio information.

The camera unit 104 can convert an optical signal to an electric signal. For instance, in case that the HMD performs a video call or a voice call, the camera unit 104 converts an image of a user to an electric signal and may be then able to deliver the signal to the other party of the call. And, in case that the HMD captures a video, the camera unit 104 converts an optical image of a target of capturing to an electric signal and can store the signal as a video information. The camera unit can include an image sensor using a charge coupled device (CCD) or a complementary metal-oxide semiconductor (CMOS). The HMD according to the present specification can include the camera unit as an optional configuration element. Hence, according to embodiment, the camera unit may be not included in the HMD.

Although it is not depicted, the HMD may further include an audio output unit. The audio output unit converts an electric signal to an audio signal and can output the audio signal. For instance, in case that the HMD performs a video call or a voice call, the audio output unit can deliver a voice of the other party of the call to a user of the HMD in a manner of outputting the voice of the other party. The HIM can include the audio output unit in the temple part. In particular, the HIM can include the audio output unit in a position adjacent to an ear piece of the temple part.

Although it is not depicted, the HMD may further include a voice recognition unit. The voice recognition unit recognizes a user's voice which is converted to the electric signal through the audio input unit. Through the voice recognition unit, the HMD can detect a voice command of the user and the controller can control the HMD corresponding to the detected voice command.

Although it is not depicted, the HMD may further include a communication unit. The communication unit transmits the user's voice which is converted to the electric signal through the audio input unit. Through the communication unit, the user of HMD can deliver the voice of the user to the other party of the call.

The controller 105 can control the display unit 101, the audio input unit 103, the camera unit 104, and the audio output unit using the information delivered from the sensor unit 102. The controller 105 can receive information on a gaze and contacts of a user from the sensor unit 102. As mentioned earlier in FIG. 2 to FIG. 3, the controller 105 can switch a mode of the HMD based on the received information.

The controller 105 can switch the mode of the HMD according to results sensed by at least two sensors among a first sensor, a second sensor, and a third sensor. If a first contact is detected by the first sensor positioned at the nose pad and a second contact is detected by the second sensor positioned at the temple, the controller 105 can activate a wearing mode of the HMD.

In the wearing mode of the HMD, if the first contact is not detected in a manner that the nose pad is separated from a nose of a user, the controller 105 can switch the wearing mode of the HMD to a mute mode. In the wearing mode of the HMD, if the first contact and the second contact are not detected in a manner that the nose pad is separated from a nose of a user and the temple is separated from a head of the user, respectively, the controller 105 can switch the wearing mode of the HMD to a non-wearing mode.

In the mute mode of the HMD, if the first contact is detected in a manner that the nose pad is contacted with a nose of a user, the controller 105 can switch the mute mode of the HMD to the wearing mode. And, in the mute mode of the HMD, if the second contact is not detected in a manner that the temple is separated from a head of a user, the controller 105 can switch the mute mode of the HMD to the non-wearing mode.

In the non-wearing mode of the HMD, if the second contact is detected in a manner that the temple is contacted with a head of a user, the controller 105 can switch the non-wearing mode of the HMD to the mute mode. In the non-wearing mode of the HMD, if the first and the second contact are detected in a manner that the nose pad is contacted with a nose of a user and the temple is contacted with a head of the user, respectively, the controller 105 can switch the non-wearing mode of the HMD to the wearing mode.

FIG. 6 is a block diagram according to one embodiment of the present specification. Blocks represented as being separated are depicted for elements of the portable device in a manner of being logically distinguished. Thus, the aforementioned elements of the portable device may be equipped with a single chip or a plurality of chips according to a design of the portable device.

Figure 7:
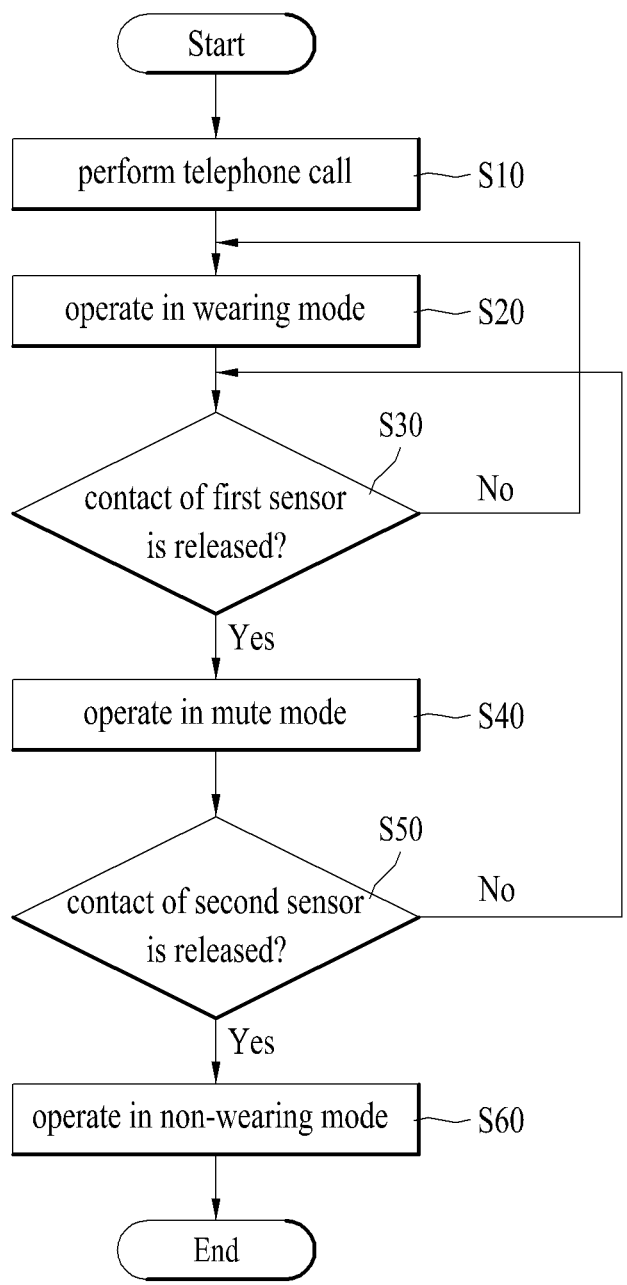
FIG. 7 is a flowchart for a telephone call operation of an HMD according to one embodiment of the present specification.

FIG. 7 is a flowchart for a telephone call operation of an HMD according to one embodiment of the present specification. The HMD can make a call [S10]. The HMD can perform a voice call or a video call via such an external device as a paired cellular phone, a smartphone, or the like. If a call is made, the HMD can detect a first contact and a second contact sensed by a first sensor and a second sensor, respectively. The first sensor of the HMD can be positioned at a nose pad part of the HMD and can sense whether a nose of a user is contacted with the nose pad. The second sensor of the HMD can be positioned at a temple part and can sense whether a head of the user is contacted with the temple.

If the first contact and the second contact are detected by the first sensor and the second sensor, respectively, the HMD can operate in a wearing mode [S20]. In the wearing mode, the HMD can receive audio information and video information from a paired cellular phone and output the audio information and the video information. The HMD outputs the received audio information via an audio output unit and can output the received video information via a display unit. And, the HMD can activate an audio input unit. The HMD can receive a voice of a user wearing the HMD via the audio input unit. The HMD can deliver the received voice of the user to the other party via an external device.

The HMD can determine whether the first contact of the first sensor is released [S30]. The first sensor of the HMD can be positioned at the nose pad of the HMD and can sense whether a nose of a user is contacted with the nose pad. If the first contact of the first sensor is maintained, the HMD can maintain the wearing mode.

If the first contact of the first sensor is released, the HMD can switch the wearing mode to a mute mode [S40]. The HMD can output the audio information and the video information received from the other party in the mute mode as well. Unlike this, the HMD can inactivate the audio input unit in the mute mode. Hence, the HMD may not deliver a voice of a user to the other party of a call.

The HMD can determine whether the second contact of the second sensor is released [S50]. The HMD can include the second sensor in the temple part of the HMD. The HMD can sense whether a head of a user is contacted with the temple part of the HMD using the second sensor. If the second contact of the second sensor is maintained, the HMD can maintain the mute mode. In this case, if a contact of the first sensor is additionally detected, the HMD may switch to the wearing mode.

If the second contact of the second sensor is released, the HMD can switch to the non-wearing mode [S60]. In the non-wearing mode, the HMD can release a pairing paired with an external device. Since a user is no longer wearing the HMD, the user can continuously make a call using the external device. In particular, the HMD can grant a control authority for making a call to the external device.

In addition to the flowchart, the HMD can determine whether a gaze is detected by a third sensor in the mute mode. Operating steps for the third sensor explained in the following description can be optionally included in the method of controlling the HMD of the present specification according to embodiment.

The third sensor can be positioned at the temple part or the display part of the HMD. The HMD can detect whether a user is able to check displayed video information using the third sensor. If the user can check the displayed video information, the HMD can maintain the mute mode. In particular, if a gaze of the user is detected by the third sensor, the HMD can maintain the display unit in an activated state.

If the user is unable to check the displayed video information, i.e., if a gaze of the user is not detected by the third sensor, the HMD can switch the mute mode to a mute and display off mode. In the mute and display off mode, the HMD can inactivate not only the audio input unit but also the display unit. In other word, if the user is unable to check the displayed video information with a vision, displaying the video information is meaningless and power consuming job. Hence, HMD inactivates the display unit and can obtain a power saving effect.

Figure 8:
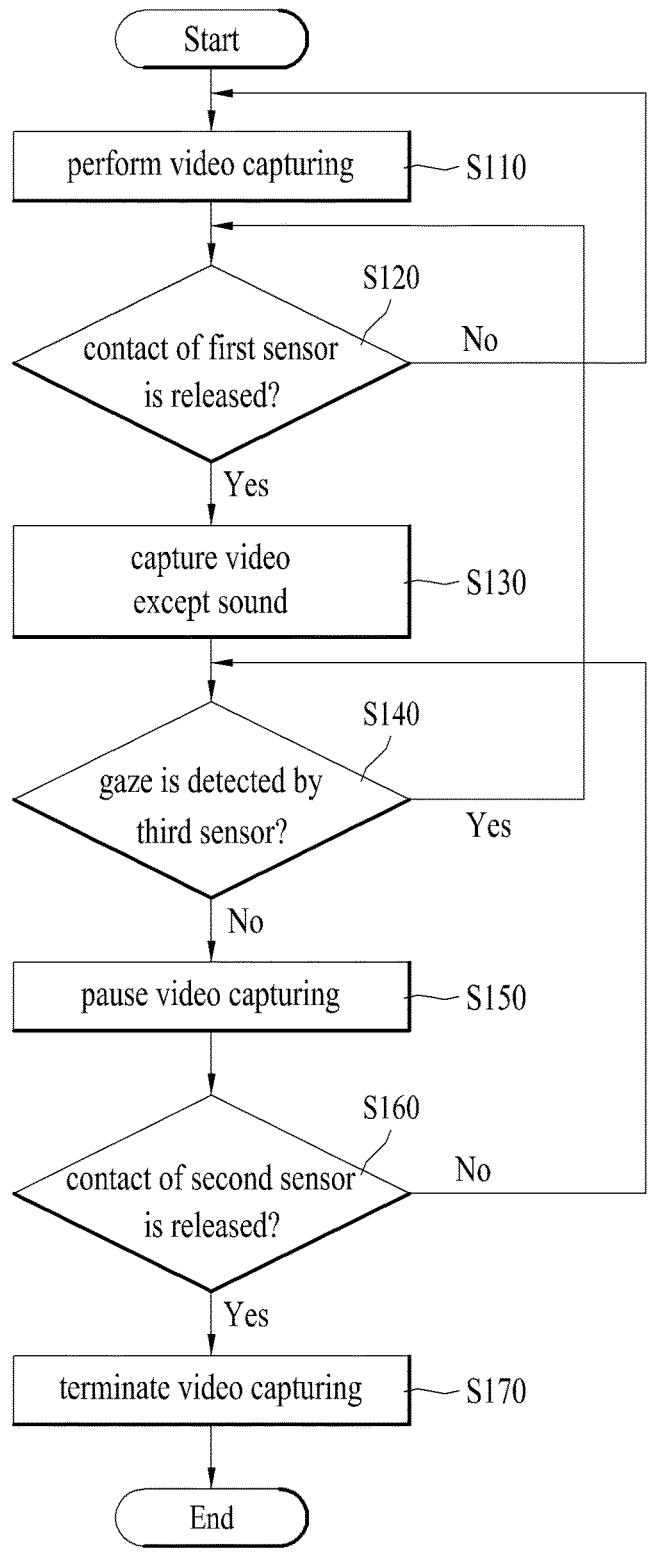
FIG. 8 is a flowchart for a video capturing according to one embodiment of the present specification.

FIG. 8 is a flowchart for a video capturing according to one embodiment of the present specification. In case of capturing a video, the HMD can operate in three kinds of mode. In the wearing mode, the HMD can store video information and audio information. In the mute mode, the HMD can selectively store the video information except the audio information. In the mute and display off mode, the HMD can temporarily stop capturing a video.

The HMD can capture a video [S110]. When a video capturing is performed, the HMD can detect a first contact and a second contact using a first sensor and a second sensor, respectively. The first sensor of the HMD can be positioned at a nose pad part of the HMD and can sense whether a nose of a user is contacted with the nose pad. The second sensor of the HMD can be positioned at a temple part and can sense whether a head of the user is contacted with the temple.

If the first contact and the second contact are detected by the first sensor and the second sensor, respectively, the HMD stores video information using the camera unit and can store audio information in a manner of activating the audio input unit. In particular, the HMD operates in the wearing mode and can make one video in a manner of combining the stored video information with the audio information.

The HMD can determine whether the first contact of the first sensor is released [S120]. If the first contact of the first sensor is maintained, the HMD maintains the stored video information and the audio information and can operate in the wearing mode.

If the first contact of the first sensor is released, the HMD can selectively store the video information except the audio information [S130]. If the first contact of the first sensor is released, the HMD can operate in the mute mode. The HMD can store the video information using the camera unit. Unlike this, the HMD stop storing the audio information and can inactivate the activated audio input unit. A video captured in the mute mode can include the video information of which the audio information is excluded.

The HMD can determine whether a gaze is detected by a third sensor [S140]. This step may be optional according to embodiment. The third sensor can be positioned at the temple part or the display part of the HMD. The HMD can detect whether a user is able to check displayed video information using the third sensor. In this case, the displayed video may correspond to video information of a video currently captured. If the user is able to check the displayed video information, the HMD can maintain the mute mode and can selectively store the video information except the audio information.

If the user is unable to check the displayed video information, i.e., if a gaze of the user is not detected by the third sensor, the HMD can temporarily stop capturing a video [S150]. This step may be optional according to embodiment. The HMD switches to a third mode and can inactivate not only the audio input unit but also the camera unit. In other word, if the user is unable to check the video information currently captured via the display unit, the HMD can stop capturing the video information in a manner of inactivating the camera unit. Consequently, the HMD can temporarily stop capturing a video in a manner of temporarily stop storing the video information and the audio information.

The HMD can determine whether the second contact of the second sensor is released [S160]. The HMD can sense whether a head of a user is contacted with the temple part of the HMD using the second sensor. If the second contact of the second sensor is maintained, the HMD can maintain the display off mode. In this case, if a gaze of the user is detected by the third sensor, the HMD may switch to the mute mode. In this case, if both the first contact of the first sensor and the gaze of the user of the third sensor are detected, the HMD can switch to the wearing mode.

If a contact of the second sensor is released, the HMD can terminate a video capturing [S170]. After terminating the video capturing, the HMD can switch to a standby state.

Figure 9:
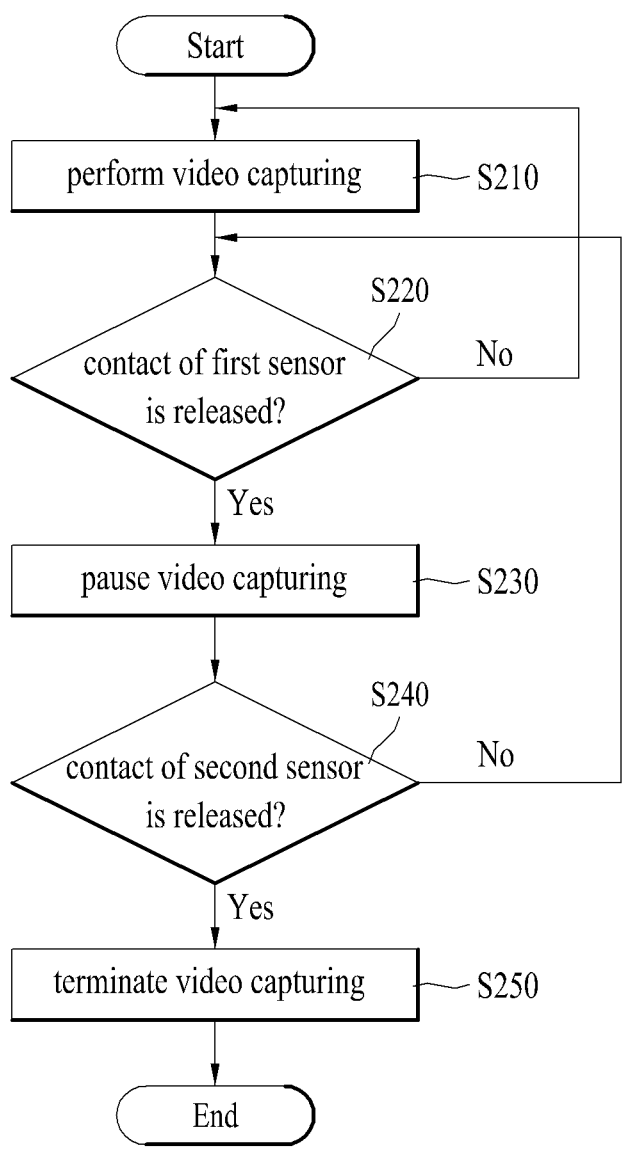
FIG. 9 is a flowchart for a video capturing according to a different embodiment of the present specification.

FIG. 9 is a flowchart for a video capturing according to a different embodiment of the present specification. In case of capturing a video, the HMD can operate in two kinds of mode. In a wearing mode, the HMD can store video information and audio information. In a pause mode, the HMD can temporarily stop storing the audio information and the video information.

The HMD can perform a video capturing [S210]. When a video capturing is performed, the HMD can detect a first contact and a second contact using a first sensor and a second sensor, respectively. The first sensor of the HMD can be positioned at a nose pad part of the HMD and can sense whether a nose of a user is contacted with the nose pad. The second sensor of the HMD can be positioned at a temple part and can sense whether a head of the user is contacted with the temple.

If the first contact and the second contact are detected by the first sensor and the second sensor, respectively, the HMD stores video information using the camera unit and can store audio information in a manner of activating the audio input unit. In particular, the WAD operates in the wearing mode and can make one video in a manner of combining the stored video information with the audio information.

The HMD can determine whether the first contact of the first sensor is released [S220]. If the first contact of the first sensor is maintained, the HMD maintains the stored video information and the audio information and can operate in the wearing mode.

If the first contact of the first sensor is released, the HMD can temporarily stop capturing a video [S230]. The HMD switches to the pause mode and can inactivate not only the audio input unit but also the camera unit. In other word, if a contact between a nose of a user and the nose pad of the HMD is released because the user lifted up the HMD, the HMD can temporarily stop capturing a video. In particular, the HMD can temporarily stop capturing a video in a manner of temporarily stop storing the video information and the audio information.

The HMD can determine whether the second contact of the second sensor is released [S240]. The HMD can sense whether a head of a user is contacted with the temple part of the HMD using the second sensor. If the second contact of the second sensor is maintained, the HMD can maintain the pause mode. In this case, if the first contact is detected by the first sensor, the HMD may switch to the wearing mode.

If a contact of the second sensor is released, the HMD can terminate a video capturing [S250]. After terminating the video capturing, the HMD can switch to a standby mode.

As mentioned in the foregoing description, the HMD according to the present specification detects a contact between a user and each part using sensors positioned at the each part. And, the HMD can switch a mode of the HMD according to a detected result. By doing so, the HMD can switch the mode of the HMD without inputting a separate control input.

Figure 10:
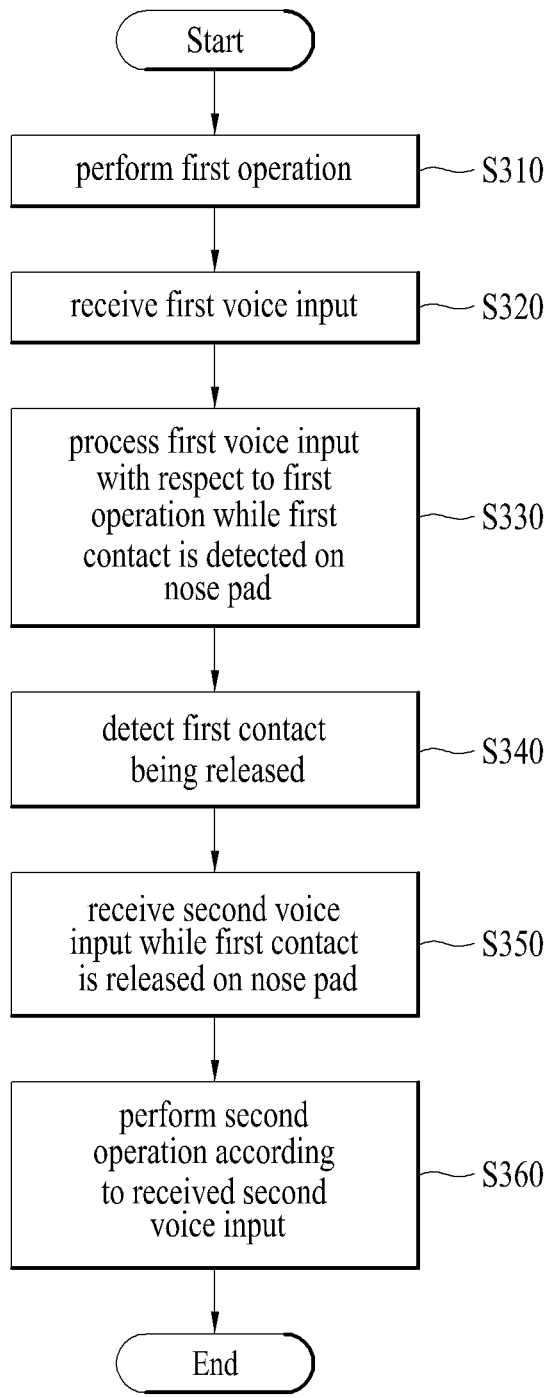
FIG. 10 is a flowchart of a method for a HMD to recognize a voice command according to one embodiment of the present specification.

FIG. 10 is a flowchart of a method for a HMD to recognize a voice command according to one embodiment of the present specification. The HMD can process an inputted voice input according to whether a first contact is detected or not. In particular, a voice input inputted when the first contact is detected and a voice input inputted when the first contact is not detected can be respectively applied to an independent operation different from each other.

The HMD can perform a first operation [S310]. The first operation may include an operation associated with a voice input. For instance, the HMD can perform telephone call, a voice recognition service or a voice command as the first operation. In the following description, telephone call is explained as an example, by which the scope of the present specification may be non-limited.

The HMD can receive a first voice input via a microphone while performing telephone call as the first operation [S320]. The first voice input can include a voice of a HMD user and the HMD can convert the first voice input into an electrical signal.

Before the received first voice input is processed, the HMD can determine whether a first contact is detected using a first sensor of the HMD. The first sensor of the HMD can be installed in a nose pad of the HMD and can sense whether the nose pad is contacted with an area designated on a head of a user. In this case, the area designated on the head of the user may correspond to a part of a nose of the user. While the first contact is detected, the HMD can process the inputted first voice input in response to the first operation [S330]. For instance, the HMD can deliver the first voice input inputted via a microphone to a counterpart in the middle of making a call. And, the HMD performs voice recognition in response to the inputted first voice input and can provide relevant information to a user by displaying it.

The HMD can detect release of the first contact in the middle of making a call [S340] or inputting the first voice input. If a user wearing the HMD slightly raises the HMD, the first contact can be released. The HMD can detect the release of the first contact via a first sensor installed in a nose pad part of the HMD. In the step S340, the HMD can additionally detect that a second contact is maintained. The HMD can include a second sensor and the second sensor may be installed in a temple part of the HMD. The second contact can be detected by the second sensor and the second contact may mean a contact between an area designated on a head of a user and a temple of the HMD.

The HMD can receive a second voice input via a microphone while the first contact is released [S350]. The HMD can receive a voice input, which is inputted while the first contact is released, as the second voice input distinguished from the first voice input. In particular, the HMD can respectively process a voice input received before the first contact is released and a voice input received after the first contact is released as an independent voice input different from each other. In doing so, although two voice inputs adjacent to each other in time are received, the HMD can process the two voice inputs as independent two voice inputs instead of processing the two voice inputs as a single voice input.

The HMD can perform a second operation according to the received second voice input [S360]. In this case, the second operation may correspond to a separate operation independent of the first operation which is performed in the step S310. For instance, if a second voice input is inputted after the first contact is released in the middle of calling, the HMD can perform a separate second operation in response to the second voice input instead of delivering the second voice input to a counterpart as content of the telephone call. In particular, the HMD recognizes the second voice input as a voice command and can perform a function corresponding to the voice command. By doing so, the HMD can perform a voice command function while performing a voice call function.

As mentioned in the foregoing description, the HMD can perform a second operation corresponding to a different operation related to a second voice input while performing a first operation related to a first voice input. In particular, the HMD can process two voice inputs received before and after a first contact is released as a single voice input or two independent voice inputs based on whether the first contact detected on a nose pad part of the HMD is maintained. By doing so, the HMD can provide a user with multitasking using a plurality of voice-related operations.

Figure 11:
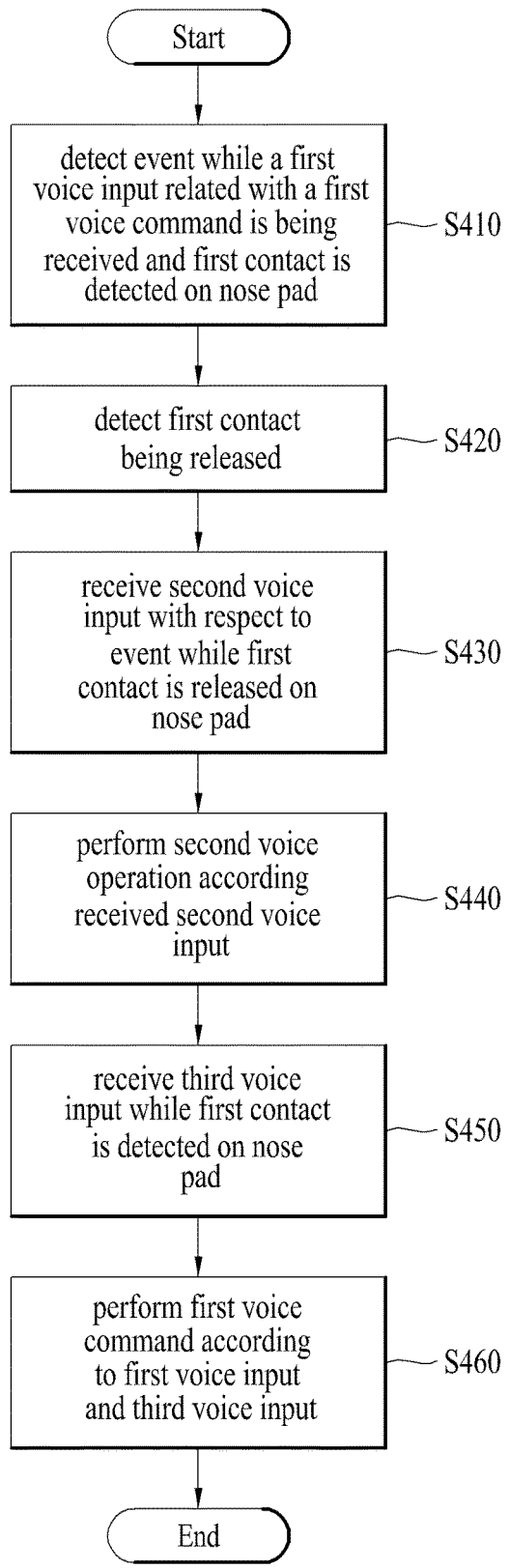
FIG. 11 is a flowchart of a method for a HMD to recognize a voice command according to a different embodiment of the present specification.

FIG. 11 is a flowchart of a method for a HMD to recognize a voice command according to a different embodiment of the present specification. The HMD can differently process an inputted voice input according to whether a first contact is detected. In particular, a voice input inputted when the first contact is detected and a voice input inputted when the first contact is not detected can be processed respectively as an independent voice command which is different from each other.

While a first voice input related to a first voice command is received and a first contact is detected by a first sensor installed in a nose pad, the HMD can detect an event [S410]. In this case, the event can include events in which a notification occurs. For instance, the event can include an e-mail reception event, a message reception event, a schedule notification event and the like. A first voice command may mean a result of analyzing a voice input of a user using a voice recognition function of the HMD. The first voice input received in the step S410 may correspond to a part of a voice input configured to obtain the first voice command. In particular, it may be not sufficient enough for the HMD to obtain the first voice command by the first voice input only.

The first sensor configured to detect the first contact can be installed in a nose pad part of the HMD and can sense whether a nose pad is contacted with an area designated on a head of a user. In this case, the area designated on the head of the user may correspond to a part of a nose of the user. And, the HMD can additionally detect that a second contact is maintained. The HMD can include a second sensor and the second sensor can be installed in a temple part of the HMD. The second contact can be detected by the second sensor and the second contact may mean a contact between the area designated on the head of the user and a temple of the HMD.

After an event is detected, the HMD can detect release of the first contact [S420]. In this case, as mentioned earlier in FIG. 10, the first contact may mean a contact between a nose pad part of the HMD and an area designated on a head of a user. In this case, the area designated on the head of the user may correspond to a part of a nose of the user.

While the first contact is released, the HMD can receive a second voice input in response to the event [S430]. Although the second voice input is consecutively received after the first voice input is received, the HMD can process the second voice input as an input for the event. In particular, the HMD does not connect the second voice input, which is received after the first voice input related to a first voice command is inputted, with the first voice command and the HMD can connect the second voice input with the event. The HMD does not connect the first voice input inputted before the release of the first contact is detected and the second voice input inputted after the release of the first contact is detected with each other and can process the first voice input and the second voice input as an independent voice input, respectively.

The HMD can perform a second voice command according to the received second voice input [S440]. In this case, the second voice command corresponds to a separate command independent of the first voice command or a command related to the detected event. In particular, if the event and the release of the first contact are detected, the HMD can process a voice input inputted after the first contact is released as a voice input that executes the second voice command connected with the event.

While the first contact is detected again after the release of the first contact, the HMD can receive a third voice input [S450]. If the first contact is detected again, the HMD can process the third voice input together with the first voice input which is received before the first contact is released. In particular, although there is a difference in receiving two voice inputs in time, the HMD can process the two voice inputs, which are received while the first contact is detected, as a single voice input in a manner of merging the two voice inputs with each other. Hence, although two voice inputs are not consecutively received, since the two voice inputs are received while the first contact is detected, the two voice inputs can be merged with each other. In the step S450, the HMD can display the previously received first voice input on the display unit to make a user easily input a third voice input.

The HMD can perform a first voice command according to a first voice input and a third voice input [S460]. In particular, the HMD can consider both the first voice input and the third voice input, which are separately received in time, to recognize the first voice command. For instance, if the HMD receives such a voice input as "set alarm" before a first contact is released and receives such a voice input as "at seven A.M." after the first contact is released and detected again, the HMD can make such a voice input as "set alarm at seven A.M." as a first voice command. By doing so, a user may mention a second voice input related to a second voice command while mentioning the first voice input related to the first voice command. And, the user may mention the third voice input related to the first voice command after the second voice input is inputted. The HMD can receive the second voice input in response to the second voice command after the first voice input corresponding to a part of the first voice command is received. Subsequently, the HMD receives the third voice input and combines the received third voice input with the first voice input and can perform the first voice command.

Figure 12:
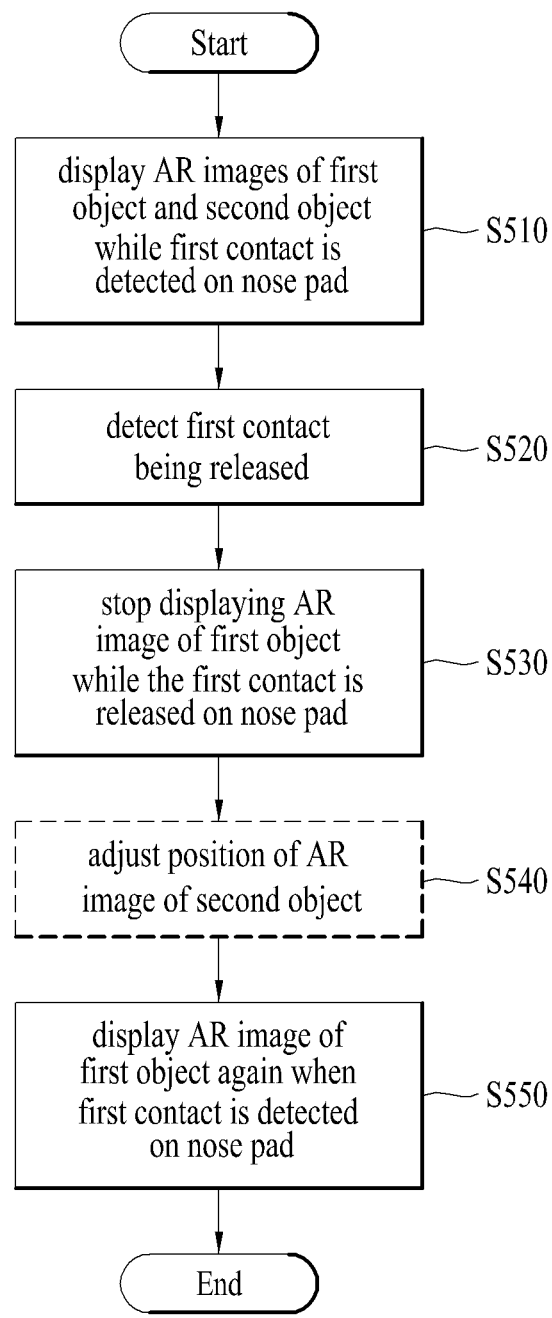
FIG. 12 is a flowchart of a method for a HMD to display an augmented reality (AR) image according to one embodiment of the present specification.

FIG. 12 is a flowchart of a method for a HMD to display an augmented reality (AR) image according to one embodiment of the present specification. The HMD can differently process a displayed AR image according to whether a first contact is detected. In particular, the HMD can differently display an AR image displayed when the first contact is detected and an AR image displayed when the first contact is not detected. And, the HMD can display an AR image, which is determined to be displayed according to whether the first contact is detected, and an AR image, which is displayed irrespective of whether the first contact is detected, in a manner of distinguishing the AR images from each other.

The HMD can display an AR image for a first object and an AR image for a second object while a first sensor installed in a nose pad detects a first contact [S510]. For instance, the AR image for the first object corresponds to an image affected by whether the first contact is detected and the AR image for the second object may correspond to an image displayed irrespective of whether the first contact is detected. The first sensor configured to detect the first contact can be installed in a nose pad part of the HMD and can sense whether a nose pad is contacted with an area designated on a head of a user. In this case, the area designated on the head of the user may correspond to a part of a nose of the user. And, the HMD can additionally detect that a second contact is maintained. The HMD can include a second sensor and the second sensor can be installed in a temple part of the HMD. The second contact can be detected by the second sensor and may mean a contact between the area designated on the head of the user and a temple of the HMD.

The HMD can detect release of the first contact in a state that the AR images are displayed [S520]. If a user wearing the HMD slightly raises the HMD, the first contact can be released. The HMD can detect the release of the first contact via a first sensor installed in a nose pad part of the HMD. In the step S520, the HMD can additionally detect that a second contact is maintained. The HMD can include a second sensor and the second sensor may be installed in a temple part of the HMD. The second contact can be detected by the second sensor and the second contact may mean a contact between a head of a user and a temple of the HMD.

The HMD may stop displaying an AR image for a first object while the first contact is released from a nose pad. In particular, the HMD displays the AR image for the first object and an AR image for a second object while the first contact is detected. On the contrary, the HMD can display the AR image for the second object only while the first contact is released. According to embodiment, the first object may correspond to an object less related to a user when the first contact is released and the second object may correspond to an object highly related to the user. The object highly related to the user may correspond to an object related to an operation executed by the HMD in a foreground and the object less related to the user may correspond to an object related to an operation executed by the HMD in a background. And, the HMD may define an AR image displayed by an application selected by a user as the AR image for the second object and an AR image displayed by an unselected application as the AR image for the first object, respectively.

The HMD can adjust a display position of an AR image for a second object while a first contact is released [S540]. The step S540 is an optional step and is represented by a dotted line in FIG. 12. If the first contact is released, the position of the AR image displayed on the display unit of the HMO can change. Hence, the HMD can adjust the position of the AR image for the second object to make the position of the AR image for the second object before the first contact is released and the position of the AR image for the second object after the first contact is released to be identical to each other. By doing so, although the position of the AR image for the second object is adjusted on the display unit of the HMD, a user may watch the AR image maintaining an identical position.

The HMD can display the AR image for the first object, which is stopped being displayed, again when the first contact is detected again on a nose pad after the first contact is released [S550]. As mentioned in the foregoing description, the HMD can classify displayed AR images into two groups. At least one or more AR images belonging to a first group are displayed when the first contact is detected and the display of the at least one or more AR images can be stopped when the first contact is released. At least one or more AR images belonging to a second group can be continuously displayed irrespective of whether the first contact is detected. As mentioned in the foregoing description, the HMD determines whether to display AR images according to release or detection of the first contact by classifying the displayed AR images into groups and the decision can be applied to the display unit. By doing so, a user is able to selectively receive preferred AR images only in a manner of raising the HMD in a state that a plurality of AR images are displayed and terminating display of a partial AR image.

Figure 13:
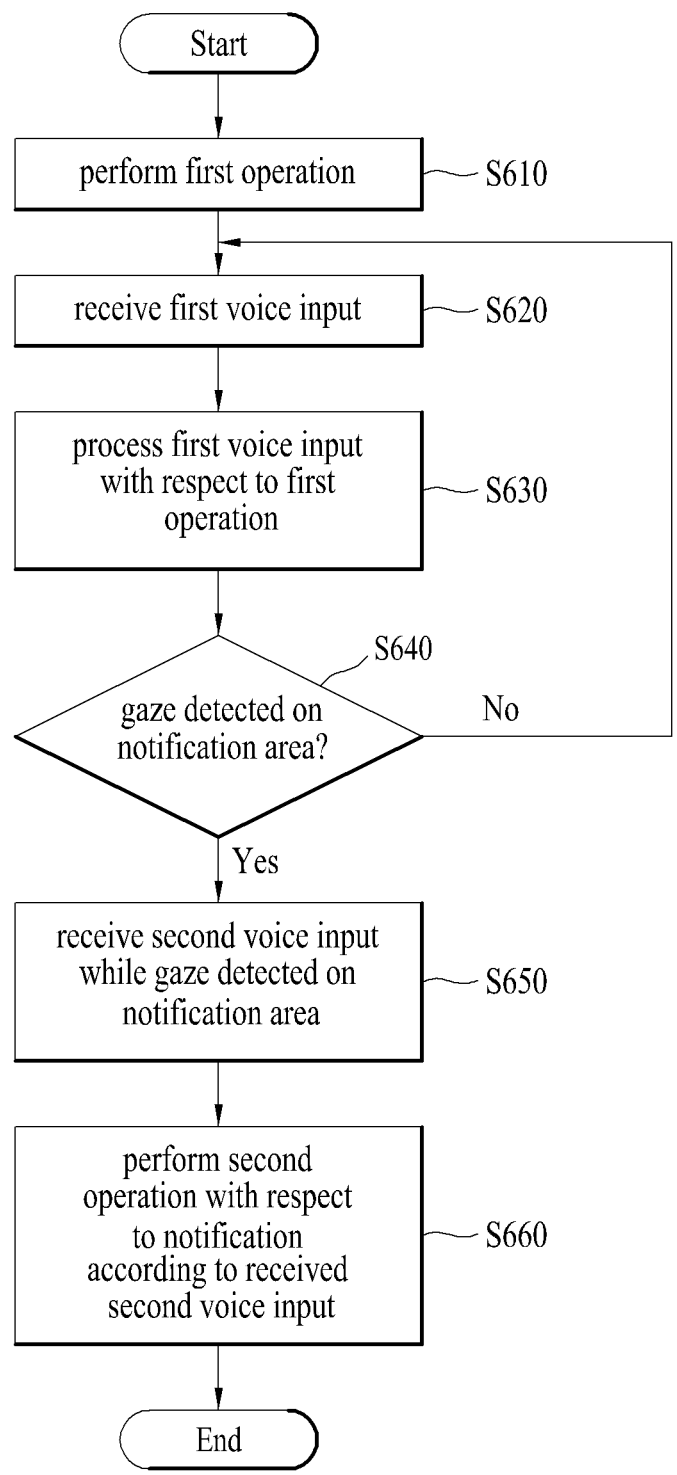
FIG. 13 is a flowchart for a method of processing a notification of a HMD according to one embodiment of the present specification.

FIG. 13 is a flowchart for a method of processing a notification of a HMD according to one embodiment of the present specification. The HMD recognizes a voice input of a user and a gaze of the user together and can determine a control target of the voice input. The HMD can differently process an inputted voice input according to a region at which the gaze of the user is heading. In particular, a voice input inputted when the gaze of the user is heading a notification region and a voice input inputted when the gaze of the user is not heading the notification region can be respectively applied to an independent operation different from each other.

The HMD can perform a first operation [S610]. The first operation can include an operation related to a voice input. For instance, the HMD can perform telephone call, a voice recognition service or a voice command as the first operation. In the following description, telephone call is explained as an example, by which the scope of the present specification may be non-limited.

The HMD can receive a first voice input via a microphone while performing telephone call as the first operation [S620]. The first voice input can include a voice of a HMD user and the HMD can convert the first voice input into an electrical signal.

The HMD can process the inputted first voice input in response to the first operation in progress [S630]. For instance, the HMD can deliver the first voice input inputted via a microphone to a counterpart in the middle of making a call. And, the HMD performs voice recognition in response to the first voice input inputted in the middle of performing a voice recognition service and can provide relevant information to a user. In particular, the HMD determines the first voice input inputted in the middle of performing the first operation as an input for the first operation and can process the first voice input in response to the first operation.

The HMD can detect a gaze of a user gazing at a notification region in the middle of making a call [S640]. To this end, the HMD can further include a user gaze detecting unit. The user gaze detecting unit may use a camera unit mentioned earlier in FIG. 6. If the user gaze is not detected in the notification region, the HMD can process the inputted voice input in response to the first operation. In this case, the notification region can be defined by a region on which a notification on an occurred event is displayed. For instance, if e-mail or a message is received or a schedule notification occurs, it can be defined by an event. A region on which an indicator or an icon indicating occurrence of the event is displayed can be defined by the notification region. According to embodiment, the notification region can be defined by a region on which a pop-up message including content of the event is displayed. If the user gaze is detected in the notification region, the HMD can indicate that a control target of a voice input inputted in the future corresponds to an indicator or an icon in a manner of changing at least one selected from the group consisting of a shape, color and a size of the indicator or the icon displayed on the notification region.

The HMD can receive a second voice input via a microphone while a user gaze is detected in a notification region [S650]. The HMD can receive a voice input, which is inputted after the user gaze is detected in the notification region, as the second voice input different from a first voice input. In particular, the HMD can differently process a voice input received before the user gaze is detected in the notification region and a voice input received after the user gaze is detected in the notification region as an independent voice input different from each other. In doing so, although two voice inputs adjacent to each other in time are received, the HMD can process the two voice inputs as independent two voice inputs instead of processing the two voice inputs as a single voice input.

The HMD can perform a second operation in response to a notification according to the received second voice input [S660]. In this case, the second operation may correspond to a separate operation independent of the first operation performed in the step S610. For instance, if a second voice input is inputted after a user gaze is detected in a notification region in the middle of calling, the HMD can perform a separate second operation in response to the second voice input instead of delivering the second voice input to a counterpart as content of the telephone call. In particular, the HMD recognizes the second voice input as a voice command for an event or a notification and can perform a function corresponding to the voice command. By doing so, the HMD can perform a function of checking the notification or a function of performing the event while performing a voice call function. The HMD converts the second voice input into a text using speech-to-text (STT) and can display the converted text on the display unit.

As mentioned in the foregoing description, the HMD can perform a second operation corresponding to an operation related to an event or a notification while performing a first operation related to a voice input. In particular, the HMD can process a voice input received before a gaze of a user is detected and a voice input received after the gaze of the user is detected as two independent voice inputs based on whether the gaze of the user is heading a notification region. By doing so, the HMD can process an event or a notification via a voice input while performing a voice-related operation.

It will be apparent to those skilled in the art that various modifications and variations can be made in the present specification without departing from the spirit or scope of the inventions. Thus, it is intended that the present specification covers the modifications and variations of this invention provided they come within the scope of the appended claims and their equivalents.

What is claimed is:

1. A head mounted display (HMD), comprising:
a display unit configured to display digital information;
an audio input unit configured to receive a voice input;
a first sensor configured to detect a first contact, wherein the first sensor is positioned at a nose pad of the HMD and detects the first contact when the nose pad of the HMD contacts a first designated area of a user's head; and
a controller configured to:
perform a first operation;
receive, through the audio input unit, a first voice input while the first contact is detected,
process the first voice input with respect to the first operation,
detect, through the first sensor, the first contact being released,
receive, through the audio input unit, a second voice input while the first contact is released,
perform a second operation according to the received second voice input,
detect the first contact again after being released,
receive, through the audio input unit, a third voice input while the first contact is detected, and
process the third voice input with respect to the first operation,
wherein processing the third voice input is sequential to processing the first voice input with respect to the first operation.

2. The HMD of claim 1, further comprising a second sensor configured to detect a second contact, wherein the second sensor is positioned at a temple of the HMD, and detects the second contact when the temple of the HMD contacts a second designated area of the user's head.

3. The HMD of claim 1, further comprising a communication unit configured to perform telecommunication by transmitting the received voice input, wherein the first operation is the telecommunication.

4. The HMD of claim 3, wherein the controller excludes the second voice input from transmission.

5. A head mounted display (HMD), comprising:
a display unit configured to display digital information;
an audio input unit configured to receive a voice input;
a first sensor configured to detect a first contact, wherein the first sensor is positioned at a nose pad of the HMD; and
a controller configured to:
detect an event while a first voice input is being received through the audio input unit and the first contact is detected, wherein the first voice input is related with a first voice command,
detect, through the first sensor, the first contact being released,
receive, through the audio input unit, a second voice input with respect to the event while the first contact is released, and
perform a second voice command according to the received second voice input,
wherein the second voice command is independent of the first voice command and the second voice command is related to the detected event.

6. The HMD of claim 5, the controller further configured to:
detect the first contact again after being released,
receive, through the audio input unit, a third voice input while the first contact is detected, and
perform the first voice command according to the first voice input and the third voice input.

7. The HMD of claim 5, wherein the second command is not related to the first command.

8. The HMD of claim 5, wherein the event includes an e-mail receiving event, a message receiving event or schedule notifying event.

9. The HMD of claim 5, wherein the controller further configured to display the second voice input on the display unit.

10. A method of controlling a head mounted display (HMD), the method comprising:
performing a first operation;
receiving, through an audio input unit, a first voice input;
processing the first voice input with respect to the first operation while a first contact is detected through a first sensor positioned at a nose pad of the HMD, wherein the first contact is detected when the nose pad of the HMD contacts a first designated area of a user's head;
detecting, through the first sensor positioned at the nose pad of the HMD, the first contact being release when the nose pad of the HMD is released from the first designated area of the user's head;
receiving, through the audio input unit, a second voice input while the first contact is released;
performing a second operation according to the received second voice input;
detecting the first contact again after being released;
receiving, through the audio input unit, a third voice input while the first contact is detected; and
processing the third voice input with respect to the first operation,
wherein processing the third voice input is sequential to processing the first voice input with respect to the first operation.

11. The method of claim 10, further comprising:
detecting, by a second sensor of the HMD, a second contact when a temple of the HMD contacts a second designated area of the user's head.

12. The method of claim 10, wherein the first operation is the telecommunication.

13. The method of claim 12, wherein the second voice input is excluded from transmission.

14. A method of controlling a head mounted display (HMD), the method comprising:
detecting an event while a first voice input is being received through an audio input unit and a first contact is detected through a first sensor positioned at a nose pad of the HMD, wherein the first voice input is related with a first voice command;
detecting, through the first sensor, the first contact being released;
receiving, through the audio input unit, a second voice input with respect to the event while the first contact is released; and
performing a second voice command according to the received second voice input,
wherein the second voice command is independent of the first voice command and the second voice command is related to the detected event.

15. The method of claim 14, further comprising:
detecting the first contact again after being release;
receiving, through the audio input unit, a third voice input while the first contact is detected; and performing the first voice command according to the first voice input and the third voice input.

16. The method of claim 14, wherein the second command is not related to the first command.

17. The method of claim 14, wherein the event includes an e-mail receiving event, a message receiving event or schedule notifying event.

18. The method of claim 14, wherein the second voice input is displayed on the display unit.

\* \* \* \* \*